US012759644B2

(12) United States Patent
Guo et al.

(10) Patent No.: US 12,759,644 B2
(45) Date of Patent: Oct. 13, 2026

(54) VEHICLE BODY FLOOR ASSEMBLY FOR VEHICLE AND VEHICLE CROSS-REFERENCE TO RELATED APPLICATIONS

(71) Applicant: SVOLT ENERGY TECHNOLOGY COMPANY LIMITED, Changzhou (CN)

(72) Inventors: Zhiyuan Guo, Changzhou (CN); Yukun Jia, Changzhou (CN); Youngbin Lim, Changzhou (CN)

(73) Assignee: SVOLT ENERGY TECHNOLOGY COMPANY LIMITED, Changzhou (CN)

( * ) Notice: Subject to any disclaimer, the term of this patent is extended or adjusted under 35 U.S.C. 154(b) by 253 days.

(21) Appl. No.: 18/689,836

(22) PCT Filed: Aug. 23, 2022

(86) PCT No.: PCT/CN2022/114119
§ 371 (c)(1),
(2) Date: Mar. 6, 2024

(87) PCT Pub. No.: WO2023/051100
PCT Pub. Date: Apr. 6, 2023

(65) Prior Publication Data

US 2024/0383538 A1 Nov. 21, 2024

(30) Foreign Application Priority Data

Sep. 29, 2021 (CN) .......................... 202111151169.3

(51) Int. Cl.
*B60K 1/04* (2019.01)
*B62D 25/20* (2006.01)

(52) U.S. Cl.
CPC ................ *B62D 25/20* (2013.01); *B60K 1/04* (2013.01); *B60K 2001/0438* (2013.01)

(58) Field of Classification Search
CPC ............. B60K 1/04; B60K 2001/0438; B60K 2001/005; B62D 25/20
See application file for complete search history.

(56) References Cited

U.S. PATENT DOCUMENTS 10,688,854 B2 6/2020 Caliskan
2012/0090907 A1 4/2012 Storc
(Continued)

FOREIGN PATENT DOCUMENTS

CN 202528831 U * 11/2012 ............... B60K 1/04
CN 106558745 A 4/2017
(Continued)

OTHER PUBLICATIONS

International Search Report and Written Opinion of the International Searching Authority for PCT Patent application No. PCT/CN2022/114119.
(Continued)

*Primary Examiner* — Tisha D Lewis
(74) *Attorney, Agent, or Firm* — Maschoff Brennan

(57) ABSTRACT

A vehicle body floor assembly for a vehicle includes a vehicle body mounting structure; and a battery pack, the battery pack including a battery module and a housing, the battery module being provided in the housing, the housing being connected to the vehicle body mounting structure, and at least a portion of the structure of the housing being configured as a vehicle body floor of the vehicle. The structure enables an integration level of a vehicle body and the battery pack to be higher. In addition, also provided is a vehicle having the vehicle body floor assembly.

16 Claims, 14 Drawing Sheets

(56) References Cited

U.S. PATENT DOCUMENTS

| | | | | |
|---|---|---|---|---|
| 2012/0097466 | A1 | 4/2012 | Usami | |
| 2018/0345778 | A1 | 12/2018 | Yamanaka | |
| 2021/0242524 | A1 | 8/2021 | Kaita et al. | |
| 2022/0185088 | A1 * | 6/2022 | Zhang | H01M 50/264 |

FOREIGN PATENT DOCUMENTS

| | | | | | |
|---|---|---|---|---|---|
| CN | 208589513 | U | | 3/2019 | |
| CN | 110329361 | A | * | 10/2019 | B62D 25/2009 |
| CN | 110329362 | A | * | 10/2019 | B62D 25/20 |
| CN | 210692627 | U | * | 6/2020 | |
| CN | 212220399 | U | | 12/2020 | |
| CN | 112277613 | A | | 1/2021 | |
| CN | 214254602 | U | | 9/2021 | |
| DE | 102011116684 | A1 | | 5/2009 | |
| DE | 102011012496 | A1 | | 8/2012 | |
| EP | 3511184 | A1 | | 7/2019 | |
| WO | 2009062405 | A1 | | 5/2009 | |
| WO | 2019185022 | A1 | | 10/2019 | |
| WO | 2019185024 | A1 | | 10/2019 | |

OTHER PUBLICATIONS

First Office Action dated Apr. 27, 2022 for CN patent application No. 202111151169.3.
Second Office Action dated Sep. 19, 2022 for CN patent application No. 202111151169.3.
Extended European search report dated Sep. 15, 2025 of corresponding EP application No. 22874493.4.
First Office Action dated Jan. 27, 2026 of corresponding IN patent application No. 202437016216.

* cited by examiner

VEHICLE BODY FLOOR ASSEMBLY FOR VEHICLE AND VEHICLE CROSS-REFERENCE TO RELATED APPLICATIONS

CROSS-REFERENCE TO RELATED APPLICATIONS

This application claims priority to Chinese Patent application No. “202111151169.3”, titled “VEHICLE BODY FLOOR ASSEMBLY FOR VEHICLE AND VEHICLE” filed by “SVOLT Energy Technology Co., Ltd” on Sep. 29, 2021.

TECHNICAL FIELD

This application relates to the field of vehicles, and in particular, to a vehicle body floor assembly for a vehicle and a vehicle having the vehicle body floor assembly for a vehicle.

BACKGROUND

As global petroleum resources keep decreasing, the transform of replacing conventional fuel vehicles with new energy vehicles in the vehicle industry is also accelerating. A battery pack is a major energy carrier for a new energy vehicle and supplies electric energy to the entire vehicle.

In the related art, a battery pack is mounted on a vehicle body floor as an independent member. Because an assembly gap exists between the battery pack and the vehicle body floor, an integration level of the battery pack and a vehicle body is low, and this is not conducive to the utilization of a height space of a vehicle.

SUMMARY OF THE INVENTION

This application is to at least resolve one of technical problems in the prior art. For this, an objective of this application is to provide a vehicle body floor assembly for a vehicle. In the vehicle body floor assembly for a vehicle, a housing of a battery pack is configured as the vehicle body floor, and the housing can replace the vehicle body floor. Compared with the prior art, a vehicle body floor does not need to be independently disposed on a vehicle, so that an integration level of a battery pack and a vehicle body can be improved, the utilization of a height space of the vehicle is facilitated, and a weight of the vehicle can be further reduced.

This application further provides a vehicle.

A vehicle body floor assembly for a vehicle according to this application includes a vehicle body mounting structure; and a battery pack, the battery pack including a battery module and a housing, the battery module being provided in the housing, the housing being connected to the vehicle body mounting structure, and at least a portion of the structure of the housing being configured as a vehicle body floor of the vehicle.

In the vehicle body floor assembly for a vehicle according to this application, a housing of a battery pack is configured as the vehicle body floor, and the housing can replace the vehicle body floor. Compared with the prior art, a vehicle body floor does not need to be independently disposed on a vehicle, so that an integration level of a battery pack and a vehicle body can be improved, the utilization of a height space of the vehicle is facilitated, and a weight of the vehicle can be further reduced.

In some embodiments of this application, the housing is provided with a vehicle body mounting member, and the vehicle body mounting member is connected to the vehicle body mounting structure.

In some embodiments of this application, the vehicle body mounting structure includes a left threshold beam, a right threshold beam, and a cross beam, the cross beam is connected between the left threshold beam and the right threshold beam, and the vehicle body mounting member is connected to the cross beam.

In some embodiments of this application, the housing includes an upper housing and a lower housing, the upper housing and the lower housing jointly define a mounting cavity for mounting the battery module, the upper housing is provided with the vehicle body mounting member, and the upper housing is configured as the vehicle body floor.

In some embodiments of this application, a connection flange is provided at a circumferential edge of the housing, and the connection flange is connected to the left threshold beam and/or the right threshold beam; and the vehicle body mounting structure further includes an end beam, the end beam is connected between the left threshold beam and the right threshold beam, and the connection flange is connected to the end beam.

In some embodiments of this application, the housing is provided with a seat mounting member, and the seat mounting member is used for mounting a seat of the vehicle.

In some embodiments of this application, the housing is provided with a high-voltage output plug-in and a low-voltage output plug-in, the high-voltage output plug-in is configured to be connected to an output terminal of the battery module, and the low-voltage output plug-in is configured to be communicatively connected to a Battery Management System (BMS) mainboard of the battery pack; and the high-voltage output plug-in and/or the low-voltage output plug-in is provided under a rear seat of the vehicle, and the high-voltage output plug-in and the low-voltage output plug-in are both configured to be connected to an electric appliance component of the vehicle.

In some embodiments of this application, the battery module is bonded to the housing.

In some embodiments of this application, the battery pack further includes a first heat exchange structure, the first heat exchange structure is provided in the housing and is located on an outer side of the battery module, and the first heat exchange structure is used for heat exchange with the battery module.

In some embodiments of this application, the battery module includes: a battery cell unit; a side frame, where the side frame is disposed to surround the battery cell unit; and a first cell support structure, where the first cell support structure is supported between the battery cell unit and the housing, the first cell support structure includes a first support body and a first bottom support rib, the first support body is used for supporting the battery cell unit and is provided with an avoidance groove penetrating the first support body, the first bottom support rib is connected to the first support body and is located on a side of the first support body away from the battery cell unit, and the first bottom support rib corresponds to the avoidance groove in a thickness direction of the first support body.

In some embodiments of this application, the battery module further includes a BMS mainboard, and the BMS mainboard is provided on the side frame.

In some embodiments of this application, the battery module includes: a prismatic battery cell; a second heat exchange structure, where the battery cell is sandwiched in the second heat exchange structure, and the second heat exchange structure is used for heat exchange with the battery cell; and a second cell support structure, where the second cell support structure is supported between the battery cell and the housing, the second cell support structure includes a second support body and a second bottom support rib, the second support body is used for supporting the battery cell, and the second bottom support rib is connected to the second support body and is located on a side of the second support body away from the battery cell.

In some embodiments of this application, the second heat exchange structure includes a plurality of heat exchange plates, the plurality of heat exchange plates are sequentially spaced apart in a length direction of the battery module to form a sandwiching space between every two adjacent heat exchange plates, and the battery cell is sandwiched in the sandwiching space; and each heat exchange plate includes a first arc-shaped portion and a second arc-shaped portion that are connected to each other, the first arc-shaped portion and the second arc-shaped portion both extend in a length direction of the heat exchange plate, a recessing direction of the first arc-shaped portion and a recessing direction of the second arc-shaped portion are opposite to each other in the length direction of the battery module, and the first arc-shaped portion and the second arc-shaped portion of one heat exchange plate from every two adjacent heat exchange plates are respectively disposed to correspond to the first arc-shaped portion and the second arc-shaped portion of the other heat exchange plate from said two adjacent heat exchange plates.

In some embodiments of this application, the second heat exchange structure further includes a first side plate and a second side plate, and two ends of each heat exchange plate are respectively connected to and in communication with the first side plate and the second side plate;

the battery module further includes an end plate, and the end plate is connected to each of two ends of the first side plate and is connected to each of two ends of the second side plate; and/or the end plate is connected to the second cell support structure; and the battery module further includes a BMS mainboard, and the BMS mainboard is provided on the end plate or the first side plate or the second side plate.

In some embodiments of this application, the second bottom support rib and the second support body jointly define a cushioning space, and the cushioning space corresponds to the battery cell in a thickness direction of the second support body;

the second bottom support rib includes at least one support rib unit, and each support rib unit together with the second support body jointly define one cushioning space;

the second bottom support rib includes a plurality of support rib units, and every two adjacent support rib units are connected to each other;

the second support body is provided with an avoidance hole penetrating the second support body, the avoidance hole is provided to correspond to the cushioning space, and an explosion relief valve of the battery cell is disposed to correspond to the avoidance hole;

each support rib unit is provided with a gas discharge notch in communication with the cushioning space; and the second cell support structure further includes a second upper support rib, the second upper support rib is provided on a surface of the second support body close to the battery cell, the second upper support rib and the second support body jointly define a mounting space for mounting the battery cell, and the second upper support rib is configured to be sandwiched between two adjacent battery cells.

A vehicle according to this application includes the foregoing vehicle body floor assembly for a vehicle.

In the vehicle according to this application, a housing of a battery pack is configured as the vehicle body floor, and the housing can replace the vehicle body floor. Compared with the prior art, a vehicle body floor does not need to be independently disposed on a vehicle, so that an integration level of a battery pack and a vehicle body can be improved, the utilization of a height space of the vehicle is facilitated, and a weight of the vehicle can be further reduced.

The additional aspects and advantages of this application are partially provided in the following description and partially become obvious from the following description or understood through the practice of this application.

DETAILED DESCRIPTION

The embodiments of this application are described below in detail. Examples of the embodiments are shown in the accompanying drawings. The same or similar numerals represent the same or similar elements or elements having the same or similar functions throughout the specification.

The embodiments described below with reference to the accompanying drawings are exemplary, and are only used to explain this application but should not be construed as a limitation to this application.

A vehicle body floor assembly for a vehicle according to an embodiment of this application is described below with reference to FIG. 1 to FIG. 18.

As shown in FIG. 1 to FIG. 18, the vehicle body floor assembly according to an embodiment of this application includes a vehicle body mounting structure 300 and a battery pack 1000. The battery pack 1000 includes a battery module 100 and a housing 200. The battery module 100 is provided in the housing 200. The housing 200 is connected to the vehicle body mounting structure 300. At least a portion of the structure of the housing 200 is configured as a vehicle body floor of a vehicle. Further, a portion of the structure of the housing 200 is configured as the vehicle body floor of the vehicle.

The vehicle body mounting structure 300 may be a chassis structure of the vehicle. The vehicle body mounting structure 300 may include structures such as a threshold beam connected to the vehicle body mounting structure 300 by the housing 200. The battery pack 1000 can be mounted on the vehicle body mounting structure 300. In addition, the housing 200 is configured as the vehicle body floor, and the arrangement of the vehicle body floor can be omitted. A vehicle body floor does not need to be independently disposed on a vehicle, so that a weight of the vehicle can be reduced. Moreover, an integration level of a battery pack and a vehicle body can be improved, and the utilization of a height space of the vehicle is facilitated.

In this way, the housing 200 is configured as the vehicle body floor, and the housing 200 can replace the vehicle body floor. Compared with the prior art, the vehicle body floor does not need to be independently disposed on the vehicle, so that an integration level of the battery pack 1000 and the vehicle body can be improved, the utilization of the height space of the vehicle is facilitated, and the weight of the vehicle can be further reduced.

Figure 1:
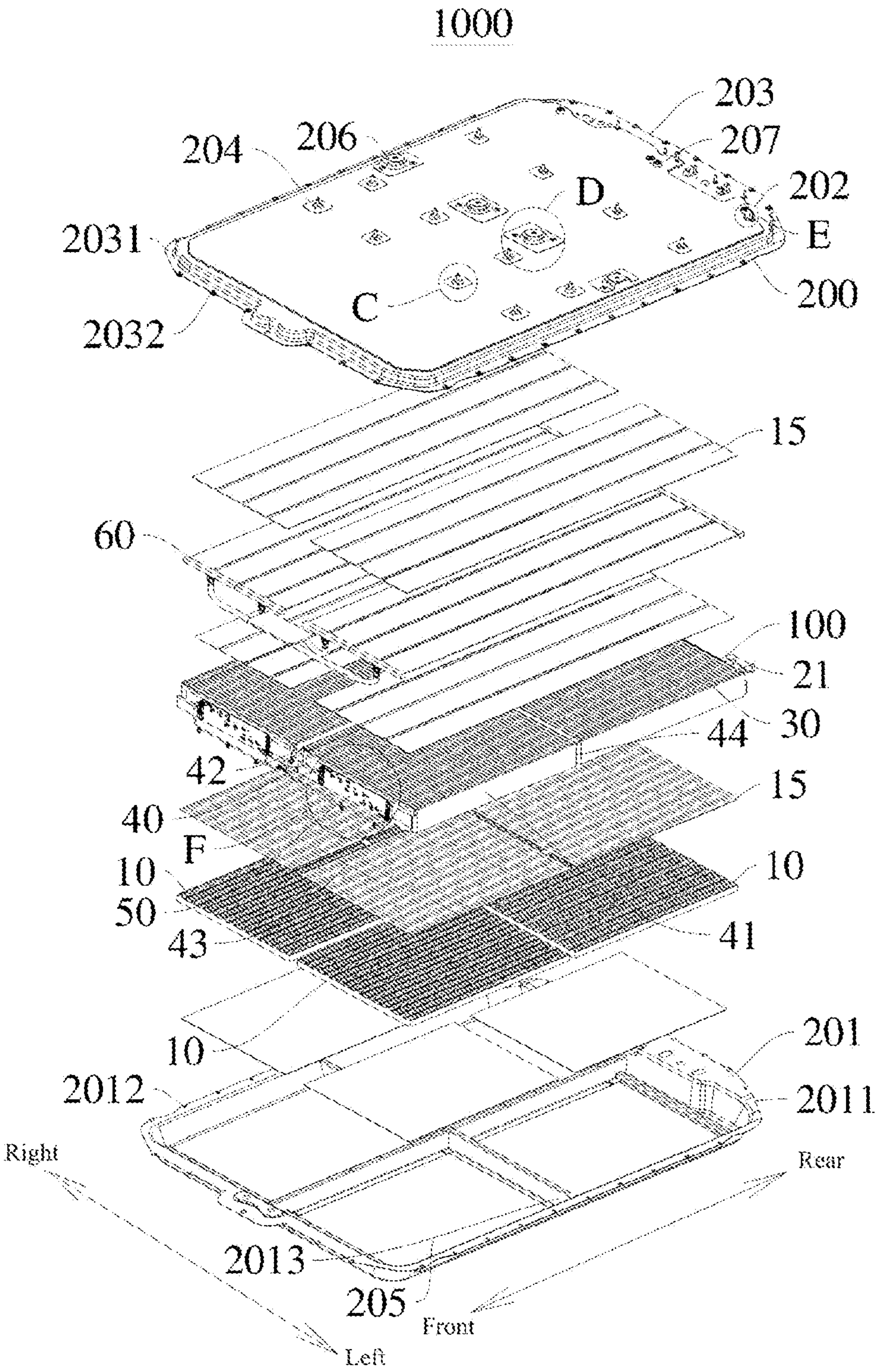
FIG. 1 is an exploded view of a battery pack of a first embodiment according to an embodiment of this application.
Figure 13:
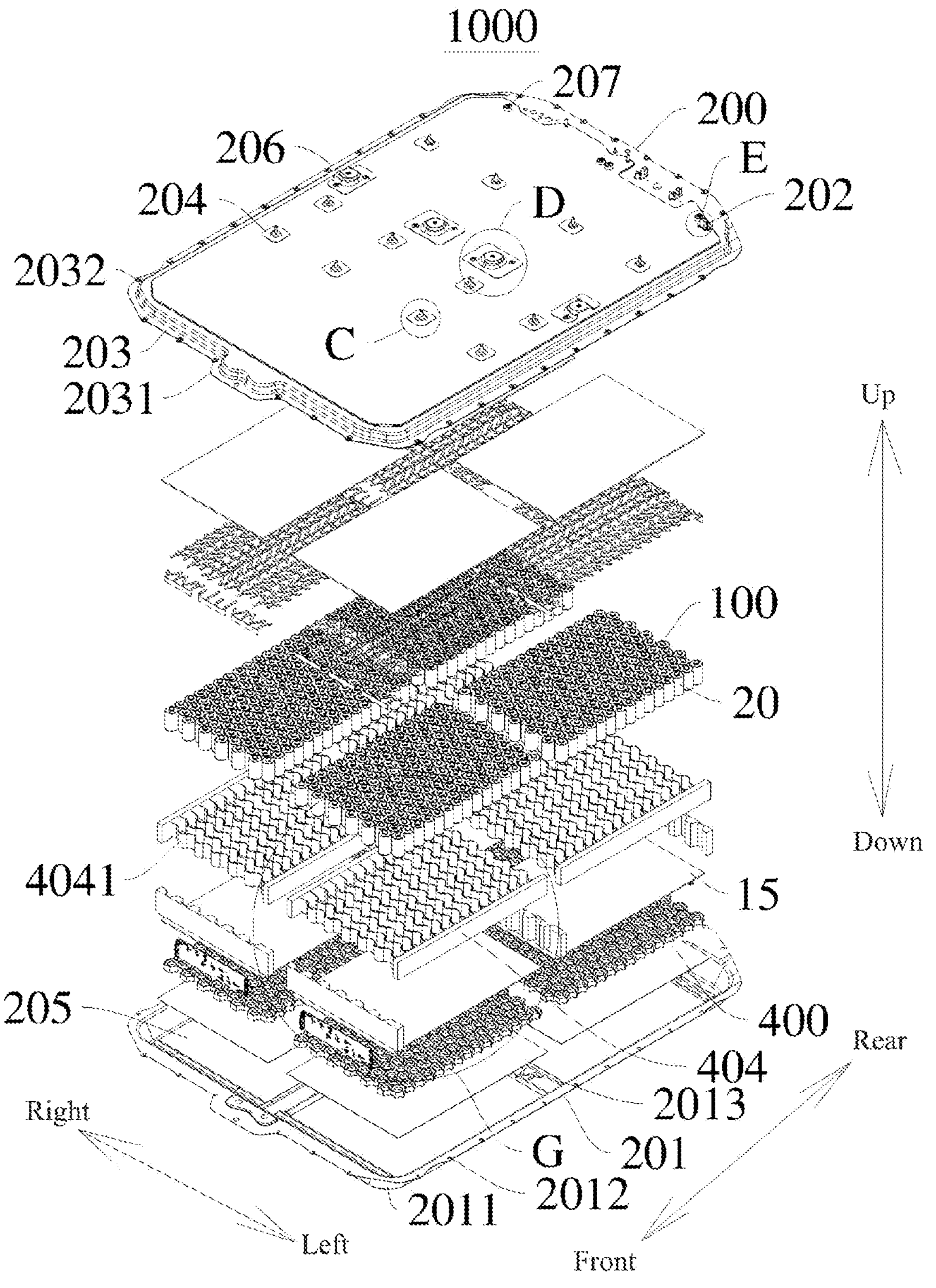
FIG. 13 is an exploded view of a battery pack of a second embodiment according to an embodiment of this application.

In some embodiments of this application, as shown in FIG. 1 and FIG. 13, the housing 200 is provided with a vehicle body mounting member 204, and the vehicle body mounting member 204 is connected to the vehicle body mounting structure 300. The vehicle body mounting member 204 is disposed, making it convenient to mount the housing 200 on the vehicle body mounting structure 300, so that mounting efficiency of the battery pack 1000 can be improved.

Figure 12:
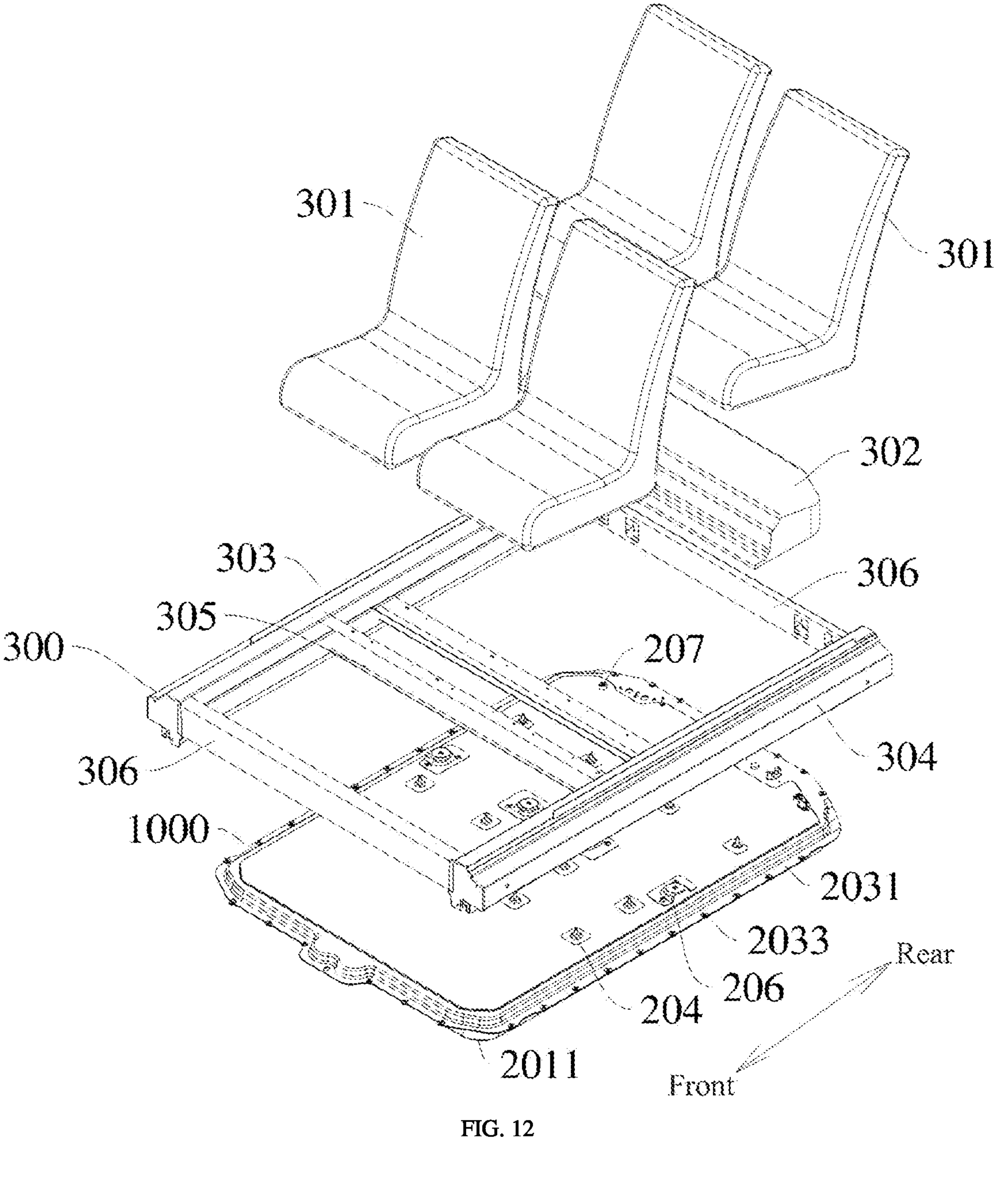
FIG. 12 is an exploded view of a battery pack, a seat, and a vehicle body mounting structure according to an embodiment of this application.

In some embodiments of this application, as shown in FIG. 12, the vehicle body mounting structure 300 includes a left threshold beam 303, a right threshold beam 304, and a cross beam 305. The cross beam 305 is connected between the left threshold beam 303 and the right threshold beam 304. One end of the cross beam 305 is welded to the left threshold beam 303, and the other end of the cross beam 305 is welded to the right threshold beam 304. The vehicle body mounting member 204 is connected to the cross beam 305. Further, the vehicle body mounting member 204 is threaded to the cross beam 305. With such an arrangement, the battery pack 1000 can be reliably mounted on the vehicle body mounting structure 300, and the battery pack 1000 can be detachably mounted on the vehicle body mounting structure 300.

In some embodiments of this application, as shown in FIG. 1 and FIG. 13, the housing 200 includes an upper housing 203 and a lower housing 201. The upper housing 203 and the lower housing 201 jointly define a mounting cavity 205 for mounting the battery module 100. The upper housing 203 is provided with the vehicle body mounting member 204. The upper housing 203 is configured as the vehicle body floor.

In some embodiments of this application, as shown in FIG. 1 and FIG. 13, a circumferential edge of the housing 200 is provided with a connection flange. The connection flange is connected to the left threshold beam 303 and/or the right threshold beam 304. Further, the vehicle body mounting structure 300 further includes an end beam 306. The end beam 306 is connected between the left threshold beam 303 and the right threshold beam 304. The end beam 306 is welded to both the left threshold beam 303 and the right threshold beam 304. The connection flange is connected to the end beam 306. With such an arrangement, the battery pack 1000 can be more reliably mounted on the vehicle body mounting structure 300.

In some embodiments of this application, as shown in FIG. 1 and FIG. 13, the housing 200 is provided with a seat mounting member 206, and the seat mounting member 206 is used for mounting a seat 301 of the vehicle. Further, in a height direction of the vehicle, the seat mounting member 206 may be disposed to correspond to a front seat 301 of the vehicle. The seat mounting member 206 may be used for mounting the front seat 301 of the vehicle. Such an arrangement can achieve the objective of mounting the seat 301 using the battery pack 1000, so that the seat 301 can be reliably mounted on the housing 200 of the battery pack 1000.

Figure 9:
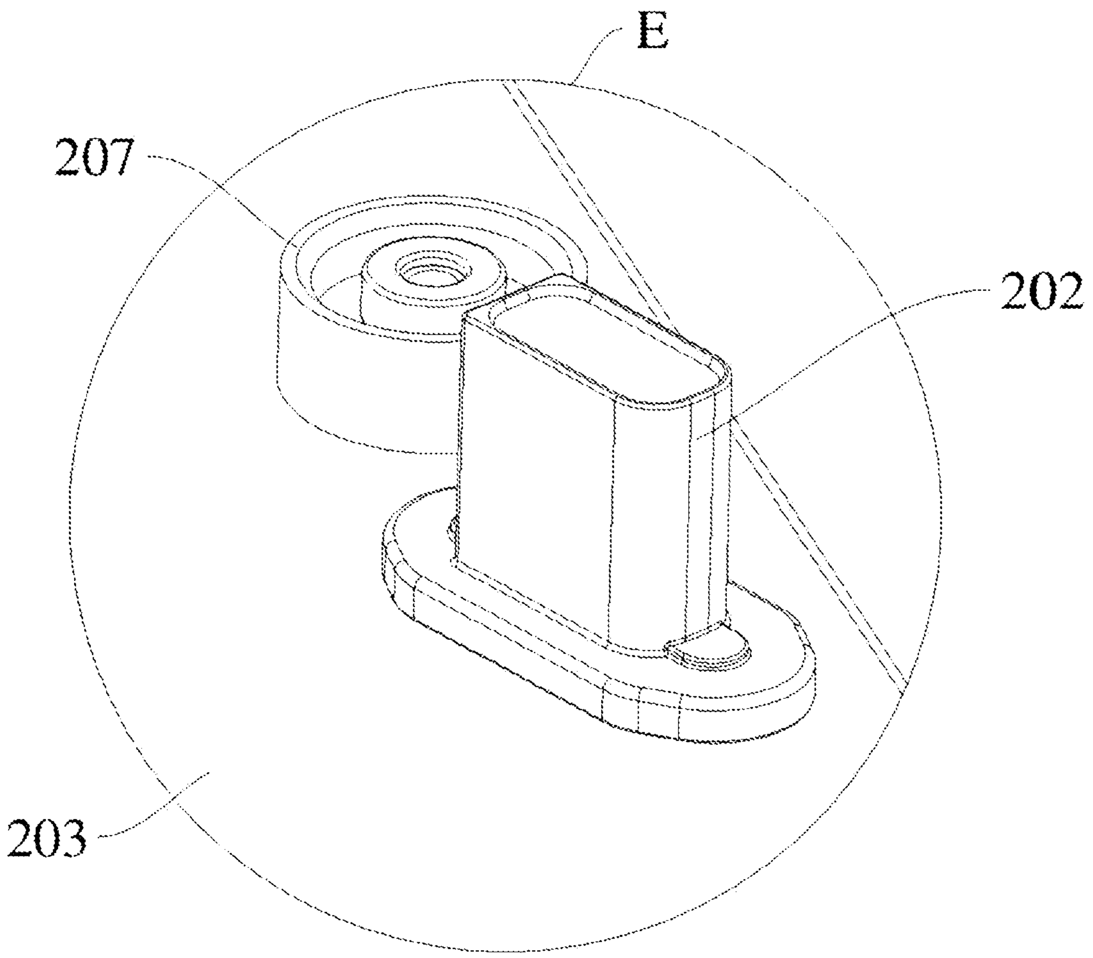
FIG. 9 is an enlarged view of E in FIG. 1.
Figure 10:
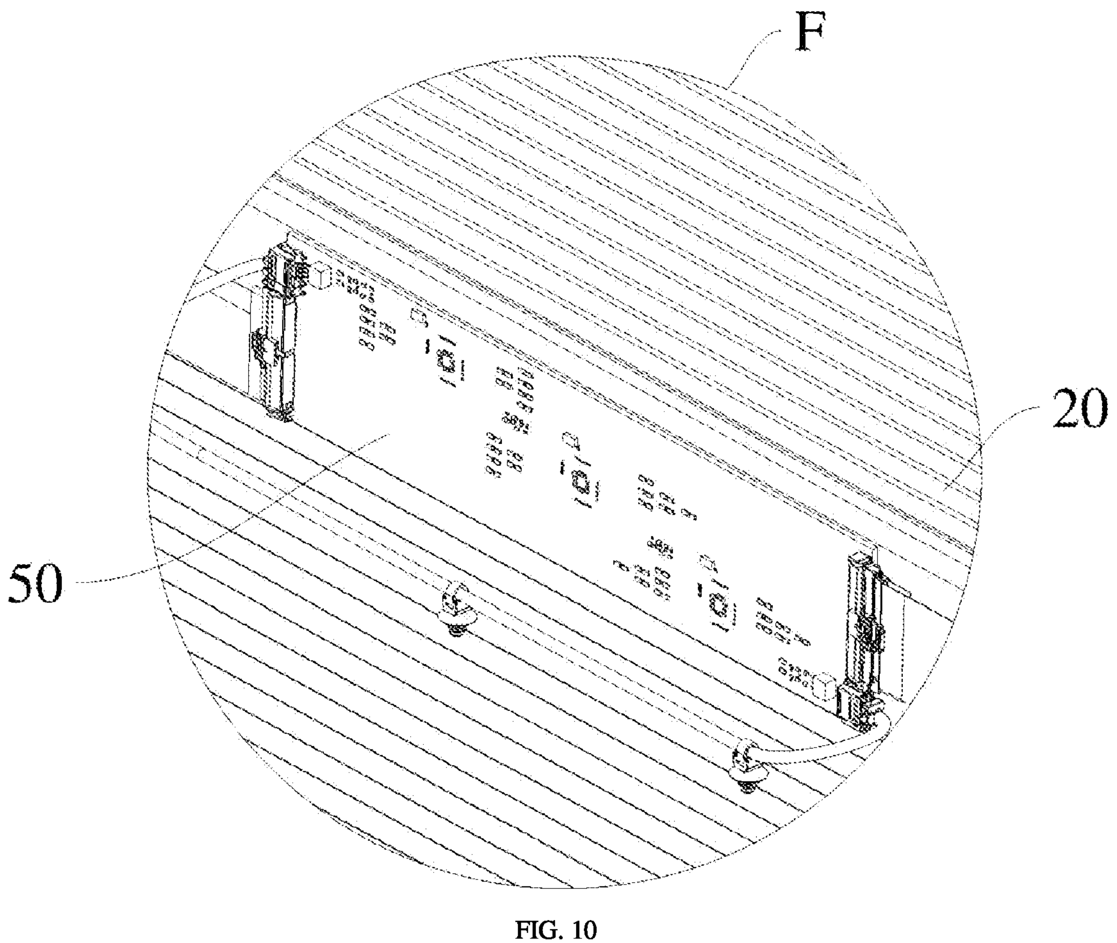
FIG. 10 is an enlarged view of F in FIG. 1.
Figure 11:
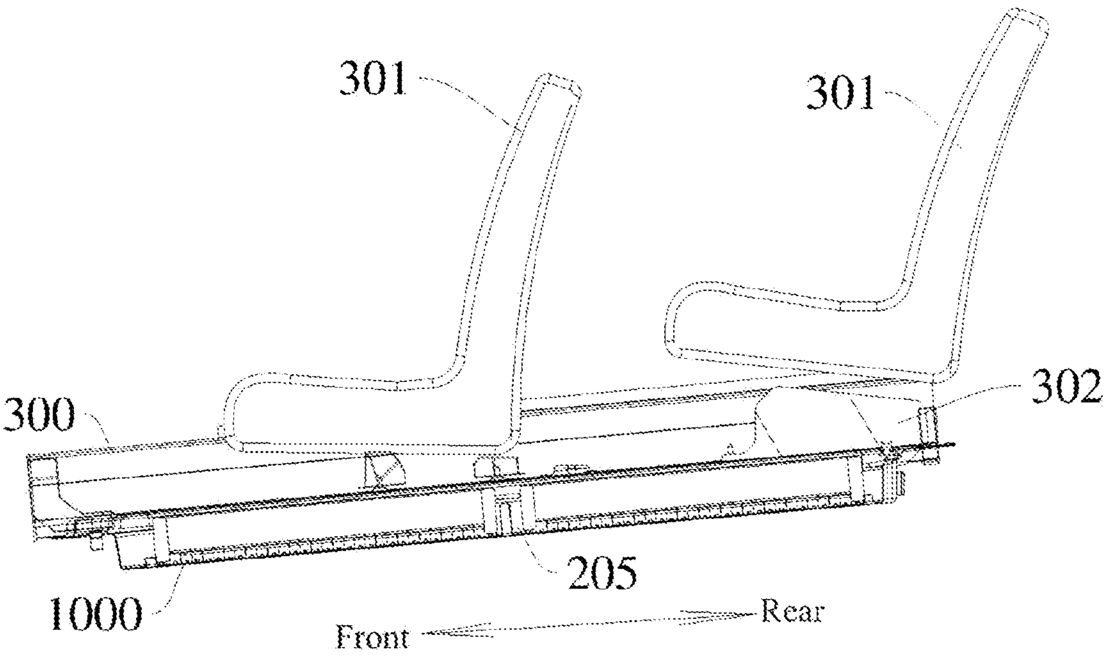
FIG. 11 is a schematic assembly diagram of the battery pack, a seat, and a vehicle body mounting structure of the first embodiment according to an embodiment of this application.

In some embodiments of this application, as shown in FIG. 1 and FIG. 9, the housing 200 is provided with a high-voltage output plug-in 207 and a low-voltage output plug-in 202. The high-voltage output plug-in 207 is configured to be connected to an output terminal 21 of the battery module 100. The low-voltage output plug-in 202 is configured to be communicatively connected to a BMS mainboard 50 of the battery pack 1000. With such an arrangement, the battery pack 1000 can output high-voltage electricity through the high-voltage output plug-in 207, and can also implement communicative connection between the BMS mainboard 50 and the outside through the low-voltage output plug-in 202.

Further, as shown in FIG. 12, the high-voltage output plug-in 207 and/or the low-voltage output plug-in 202 is provided under a rear seat 301 of the vehicle. Preferably, the high-voltage output plug-in 207 and the low-voltage output plug-in 202 are both provided under the rear seat 301 of the vehicle. An electric appliance component 302 is disposed between the rear seat 301 of the vehicle and the battery pack 1000, so that it can be convenient to repair the electric appliance component 302. In addition, the high-voltage output plug-in 207 and the low-voltage output plug-in 202 are both configured to be connected to the electric appliance component 302 of the vehicle. It needs to be noted that, the electric appliance component 302 is disposed outside the battery pack 1000. The electric appliance component 302 may include structural members such as a power distribution unit of the vehicle and a distribution box of the battery pack 1000. The high-voltage output plug-in 207 may be connected to the power distribution unit. The low-voltage output plug-in 202 may be connected to the distribution box. The distribution box is disposed outside the battery pack 1000, so that an internal space of the battery pack 1000 can be saved, and the energy density of the battery pack 1000 can be improved.

In some embodiments of this application, as shown in FIG. 1 and FIG. 13, the battery module 100 is bonded to the housing 200. Further, the battery module 100 is bonded to an inner surface of the housing 200 by a structural adhesive 15.

As shown in FIG. 1 to FIG. 12, a battery pack 1000 according to a first embodiment of this application includes a housing 200, a battery module 100, and a first heat exchange structure 60. The battery module 100 is provided in the housing 200. The first heat exchange structure 60 is provided in the housing 200 and is located on an outer side of the battery module 100. The first heat exchange structure 60 is used for heat exchange with the battery module 100. Further, the first heat exchange structure 60 may be disposed as a heat exchange plate. The heat exchange plate performs heat exchange with the battery module 100 to keep the battery pack 1000 at an appropriate working temperature.

As shown in FIG. 1 to FIG. 12, the housing 200 includes the upper housing 203 and the lower housing 201. The upper housing 203 is connected to the lower housing 201. The upper housing 203 and the lower housing 201 jointly define the mounting cavity 205 for mounting the battery module 100 of the battery pack 1000. The battery module 100 is mounted in the mounting cavity 205. The housing 200 is provided with the vehicle body mounting member 204. Specifically, the upper housing 203 is provided with the vehicle body mounting member 204. The vehicle body mounting member 204 is configured to be connected to the vehicle body mounting structure 300 of the vehicle. The housing 200 is configured as the vehicle body floor of the vehicle. Specifically, the upper housing 203 is configured as the vehicle body floor of the vehicle.

It needs to be noted that the vehicle body mounting structure 300 may be the chassis structure of the vehicle. The vehicle body mounting structure 300 may include structures such as a threshold beam. The vehicle body mounting member 204 may be disposed as a bolt, and the bolt is connected to the vehicle body mounting structure 300. However, this application is not limited thereto. The vehicle body mounting member 204 may be clamped or welded to the vehicle body mounting structure 300. The vehicle body mounting member 204 is connected to the vehicle body mounting structure 300. The battery pack 1000 can be mounted on the vehicle body mounting structure 300. In addition, the upper housing 203 is configured as the vehicle body floor, and the arrangement of the vehicle body floor can be omitted. A vehicle body floor does not need to be independently disposed on a vehicle, so that a weight of the vehicle can be reduced. Moreover, an integration level of a battery pack and a vehicle body can be improved, and the utilization of a height space of the vehicle is facilitated.

In this way, the upper housing 203 is configured as the vehicle body floor, and the upper housing 203 can replace the vehicle body floor. Compared with the prior art, the vehicle body floor does not need to be independently disposed on the vehicle, so that an integration level of the battery pack 1000 and the vehicle body can be improved, the utilization of the height space of the vehicle is facilitated, and the weight of the vehicle can be further reduced.

In some embodiments of this application, the vehicle body mounting member 204 is threaded to the vehicle body mounting structure 300. A plurality of vehicle body mounting members 204 may be disposed. The plurality of vehicle body mounting members 204 may all be disposed as bolts. The bolts may be integrally formed with the upper housing 203, and the bolts are threadedly connected to the vehicle body mounting structure 300 to reliably assemble the battery pack 1000 on the vehicle body mounting structure 300, to keep the battery pack 1000 from falling off the vehicle body mounting structure 300. The vehicle body mounting member 204 is threaded to the vehicle body mounting structure 300, making it convenient to detach the battery pack 1000 from the vehicle body mounting structure 300 and also making it convenient to mount the battery pack 1000 on the vehicle body mounting structure 300.

Figure 8:
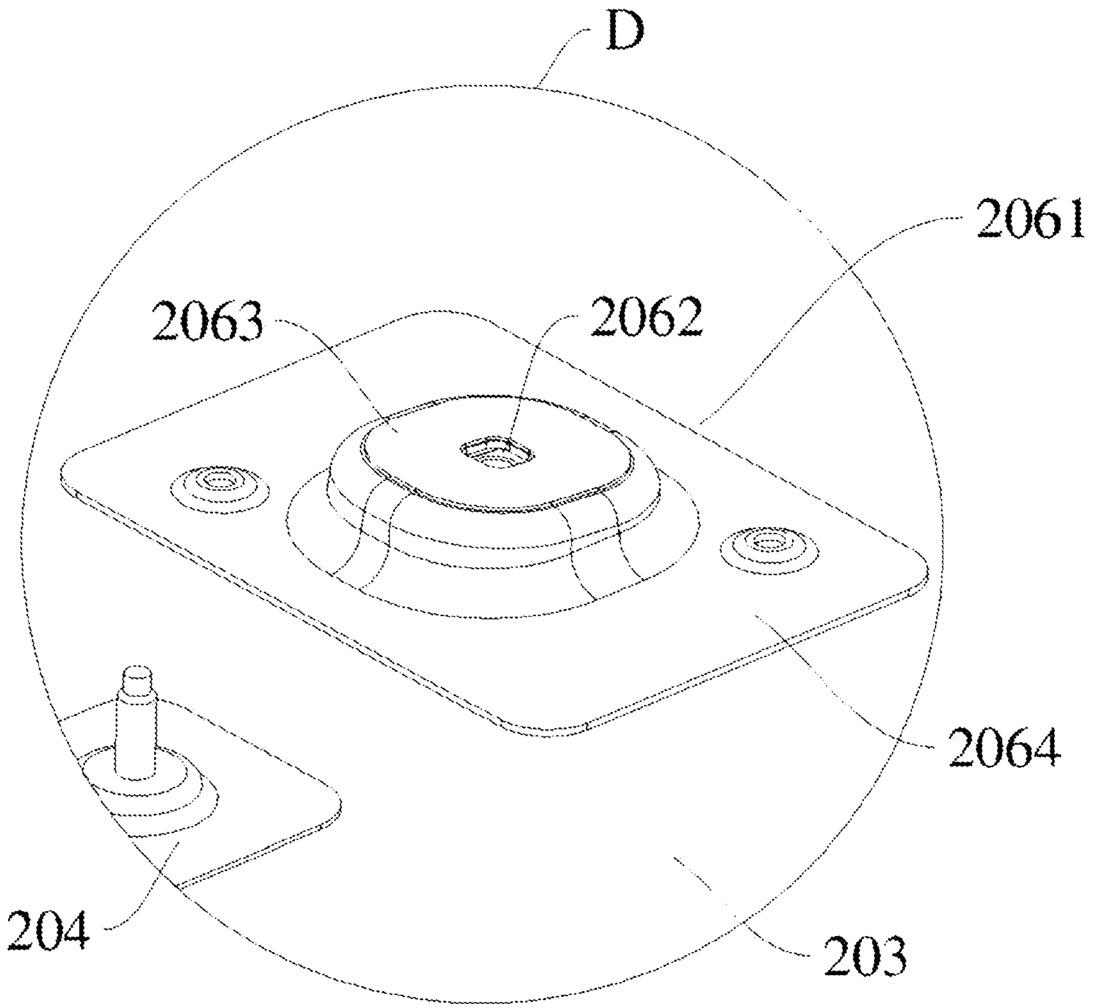
FIG. 8 is an enlarged view of D in FIG. 1.

In some embodiments of this application, as shown in FIG. 1 and FIG. 8, the upper housing 203 is provided with a seat mounting member 206, and the seat mounting member 206 is used for mounting a seat 301 of the vehicle. Further, in a height direction of the vehicle, the seat mounting member 206 may be disposed to correspond to a front seat 301 of the vehicle. The seat mounting member 206 may be used for mounting the front seat 301 of the vehicle. Such an arrangement can achieve the objective of mounting the seat 301 using the battery pack 1000, so that the seat 301 can be reliably mounted on the housing 200 of the battery pack 1000.

In some embodiments of this application, as shown in FIG. 8, the seat mounting member 206 may include a seat mounting support 2061. A nut 2062 is provided in the seat mounting support 2061. The nut 2062 is configured to be connected to the seat 301. The seat mounting support 2061 is mounted on the upper housing 203. The seat 301 may be disposed with a bolt. Through a connection between the bolt and the nut 2062, the seat 301 may be reliably mounted on the seat mounting member 206. However, this application is not limited thereto. The seat mounting member 206 and the seat 301 may be connected to each other in another manner. For example, the seat mounting member 206 is clamped to the seat 301. The seat mounting member 206 and the seat 301 may be alternatively welded.

In some embodiments of this application, as shown in FIG. 8, the seat mounting support 2061 may include a mounting body 2063 and a mounting flange 2064. The mounting flange 2064 is connected to the upper housing 203. The nut 2062 is disposed on the mounting body 2063. The mounting body 2063 and the upper housing 203 are spaced apart. The mounting body 2063 and the upper housing 203 are spaced apart, so that an avoidance space can be formed between the mounting body 2063 and the upper housing 203. When the nut 2062 is connected to the bolt, the avoidance space can avoid the bolt, so that it can be ensured that the seat 301 is reliably mounted on the housing 200. In addition, the mounting flange 2064 is connected to the upper housing 203, and the mounting flange 2064 has a plate-shaped structure, so that a contact area between the seat mounting support 2061 and the upper housing 203 can be increased, and the seat mounting support 2061 can be stably mounted on the upper housing 203.

In some embodiments of this application, as shown in FIG. 1 and FIG. 9, the upper housing 203 is provided with a high-voltage output plug-in 207 and a low-voltage output plug-in 202. The high-voltage output plug-in 207 is configured to be connected to an output terminal 21 of the battery module 100. The low-voltage output plug-in 202 is configured to be communicatively connected to a BMS mainboard 50 of the battery pack 1000. With such an arrangement, the battery pack 1000 can output high-voltage electricity through the high-voltage output plug-in 207, and can also implement a communicative connection between the BMS mainboard 50 and the outside through the low-voltage output plug-in 202.

Further, as shown in FIG. 12, the high-voltage output plug-in 207 and/or the low-voltage output plug-in 202 is provided under a rear seat 301 of the vehicle. Preferably, the high-voltage output plug-in 207 and the low-voltage output plug-in 202 are both provided under the rear seat 301 of the vehicle. An electric appliance component 302 is disposed between the rear seat 301 of the vehicle and the battery pack 1000, so that it can be convenient to repair the electric appliance component 302. In addition, the high-voltage output plug-in 207 and the low-voltage output plug-in 202 are both configured to be connected to the electric appliance component 302 of the vehicle. It needs to be noted that, the electric appliance component 302 is disposed outside the battery pack 1000. The electric appliance component 302 may include structural members such as a power distribution unit of the vehicle and a distribution box of the battery pack 1000. The high-voltage output plug-in 207 may be connected to the power distribution unit. The low-voltage output plug-in 202 may be connected to the distribution box. The distribution box is disposed outside the battery pack 1000, so that an internal space of the battery pack 1000 can be saved, and the energy density of the battery pack 1000 can be improved.

In some embodiments of this application, as shown in FIG. 1 and FIG. 12, an upper connection flange 2031 is provided at a circumferential edge of the upper housing 203. A lower connection flange 2011 is provided at a circumferential edge of the lower housing 201. The upper connection flange 2031 and the lower connection flange 2011 are connected to each other in a sealed manner. Such an arrangement can improve the airtightness of the mounting cavity 205, and can keep dust and other foreign matter from entering the mounting cavity 205.

Further, as shown in FIG. 1 and FIG. 12, an upper connecting hole 2032 is provided on the upper connection flange 2031, and a lower connecting hole 2012 corresponding to the upper connecting hole 2032 is provided on the lower connection flange 2011. A fastening member (for example, a bolt) passes through both the upper connecting hole 2032 and the lower connecting hole 2012 and is configured to be connected to the vehicle body mounting structure 300. The fastening member may sequentially pass through the lower connection flange 2011 and the upper connecting hole 2032 to be connected to the vehicle body mounting structure 300. With such an arrangement, the battery pack 1000 can be stably mounted on the vehicle body mounting structure 300, and the battery pack 1000 can be kept from falling off.

In some embodiments of this application, the housing 200 may be provided with a repair hole and a repair cover. The repair hole is provided to correspond to the BMS mainboard 50. The repair cover is used for opening or closing the repair hole, to make it convenient to repair the BMS mainboard 50.

In some embodiments of this application, as shown in FIG. 12, the upper housing 203 is provided with a spacer 2033. The spacer 2033 is disposed to correspond to the upper connecting hole 2032. The spacer 2033 is used for limiting a position.

In some embodiments of this application, the battery module 100 is bonded to the housing 200. Further, the battery module 100 may be bonded to the lower housing 201 by the structural adhesive 15, to fix the battery module 100 in the housing 200.

In some embodiments of this application, the first heat exchange structure 60 is provided between the battery module 100 and the housing 200, and the first heat exchange structure 60 is bonded to both the battery module 100 and the housing 200. Further, the first heat exchange structure 60 may be bonded to the battery module 100 and the first heat exchange structure 60 may be bonded to the housing 200 both through the structural adhesive 15, and the first heat exchange structure 60 may be disposed between the upper housing 203 and the battery module 100, to stably mount the first heat exchange structure 60 and the battery module 100 in the housing 200.

In some embodiments of this application, as shown in FIG. 1, the lower housing 201 is provided with a lower housing cross beam 2013. The lower housing cross beam 2013 is used for improving the mode and stiffness of the battery pack 1000. Further, the lower housing cross beam 2013 may be connected to a bottom wall and a side wall of the lower housing 201, so that the structural strength of the lower housing 201 can be improved.

As shown in FIG. 1, the battery pack 1000 according to an embodiment of this application includes the housing 200 in the foregoing embodiment. The upper housing 203 is configured as the vehicle body floor, and the upper housing 203 can replace the vehicle body floor. Compared with the prior art, the vehicle body floor does not need to be independently disposed on the vehicle, so that an integration level of the battery pack 1000 and the vehicle body can be improved, the utilization of the height space of the vehicle is facilitated, and the weight of the vehicle can be further reduced.

The battery module 100 according to an embodiment of this application is described below with reference to FIG. 1 to FIG. 6.

As shown in FIG. 1 to FIG. 6, for the battery module 100 according to an embodiment of this application, the battery module 100 includes a battery cell unit 30, a side frame 40, and a first cell support structure 10. The side frame 40 is disposed to surround the battery cell unit 30. Further, the side frame 40 is configured as a closed-ring structure. The side frame 40 is disposed to surround a side surface of the battery cell unit 30. The side frame 40 may be bonded to the battery cell unit 30.

As shown in FIG. 1 to FIG. 6, the first cell support structure 10 is supported between a battery cell 20 and the housing 200. The first cell support structure 10 includes a first support body 11 and a first bottom support rib 12. The first support body 11 is used for supporting the battery cell unit 30. Further, the battery cell unit 30 is disposed on an upper surface of the first support body 11, and the first support body 11 is provided with an avoidance groove 111 penetrating the first support body 11. Further, in a thickness direction of the first support body 11, the avoidance groove 111 penetrates the first support body 11. The first bottom support rib 12 is connected to the first support body 11 and is located on a side of the first support body 11 away from the battery cell unit 30. For example, the battery cell unit 30 is disposed on the upper surface of the first support body 11, and the first bottom support rib 12 is provided under the first support body 11. The first bottom support rib 12 and the avoidance groove 111 are disposed correspondingly in the thickness direction of the first support body 11. Preferably, the first bottom support rib 12 and the avoidance groove 111 are disposed right opposite to each other in the thickness direction of the first support body 11.

The battery module 100 is provided with the first cell support structure 10. In this case, the first cell support structure 10 is a structure of the battery module 100. However, this application is not limited thereto. The first cell support structure 10 may be disposed as an independent part. Preferably, the first cell support structure 10 is the structure of the battery module 100. When the first cell support structure 10 supports the battery cell unit 30, a gap is provided between the first bottom support rib 12 and the battery cell unit 30. That is, the battery cell unit 30 and the first bottom support rib 12 are spaced apart. When a bottom of the first cell support structure 10 is impacted, the first cell support structure 10 performs cushioning. The first cell support structure 10 can absorb an impact force, and can reduce an impact force on the battery cell unit 30, so that the use safety of the battery module 100 can be improved, and the service life of the battery module 100 can be extended.

Further, the battery module 100 may be mounted in the housing 200 of the battery pack 1000. Certainly, the battery module 100 may be mounted on another part. This application is described by using an example in which the battery module 100 is mounted in the housing 200 of the battery pack 1000. The battery module 100 is mounted in the housing 200 of the battery pack 1000. The first cell support structure 10 is supported under the battery cell unit 30. Further, the first cell support structure 10 is supported between the battery cell unit 30 and the housing 200 (the lower housing 201). When a bottom of the housing 200 (the lower housing 201) of the battery pack 1000 is impacted, because the gap is provided between the first bottom support rib 12 and the battery cell unit 30, the impact force is not directly transferred to the battery cell unit 30 through the first bottom support rib 12. The first cell support structure 10 can absorb the impact force. The first cell support structure 10 can deform and absorb energy, and can reduce the impact force on the battery cell unit 30, so that the use safety of the battery module 100 and the battery pack 1000 can be improved, and the service life of the battery module 100 and the battery pack 1000 can be extended.

In this way, the first bottom support rib 12 and the avoidance groove 111 are disposed correspondingly. The first cell support structure 10 is mounted in the housing 200 of the battery pack 1000 to support the battery cell unit 30. When the bottom of the housing 200 of the battery pack 1000 is impacted, the first cell support structure 10 performs cushioning. The first cell support structure 10 can absorb an impact force, and can reduce the impact force on the battery cell unit 30, so that the use safety of the battery module 100 and the battery pack 1000 can be improved, and the service life of the battery module 100 and the battery pack 1000 can be extended.

In some embodiments of this application, as shown in FIG. 1, the housing 200 includes the lower housing 201 and the upper housing 203. The lower housing 201 and the upper housing 203 are connected to each other in a sealed manner. The battery module 100 is mounted between the lower housing 201 and the upper housing 203.

In some embodiments of this application, as shown in FIG. 1, the battery pack 1000 may further include a BMS mainboard 50. The BMS mainboard 50 is connected to the low-voltage output plug-in 202 of the battery pack 1000 by a bundle. The BMS mainboard 50 is disposed on the side frame 40. Further, the BMS mainboard 50 may be mounted on the side frame 40 through bonding. The BMS mainboard 50 may be mounted on the side frame 40 by a bolt, or the BMS mainboard 50 may be clamped on the side frame 40. The BMS mainboard 50 is disposed on the side frame 40, so that the BMS mainboard 50 can be integrated on the battery module 100. An overall structure of the battery module 100 and the BMS mainboard 50 is compact. After the battery module 100 is mounted in the housing 200, the BMS mainboard 50 can be kept from occupying another position or space of the battery pack 1000, so that space utilization in the battery pack 1000 can be improved.

In some embodiments of this application, as shown in FIG. 1, the side frame 40 may include a left side frame 41, a right side frame 42, a front side frame 43, and a rear side frame 44. The left side frame 41, the right side frame 42, the front side frame 43, and the rear side frame 44 may all be configured as plate-shaped structures. The left side frame 41, the right side frame 42, the front side frame 43, and the rear side frame 44 are sequentially connected end to end. The left side frame 41 is located on a left side of the battery cell unit 30, the right side frame 42 is located on a right side of the battery cell unit 30, the front side frame 43 is located on a front side of the battery cell unit 30, and the rear side frame 44 is located on a rear side of the battery cell unit 30. The BMS mainboard 50 may be mounted on the front side frame 43. Such an arrangement can make the structure of the side frame 40 simple, making it convenient to assemble the side frame 40 and the battery cell unit 30 together.

Figure 2:
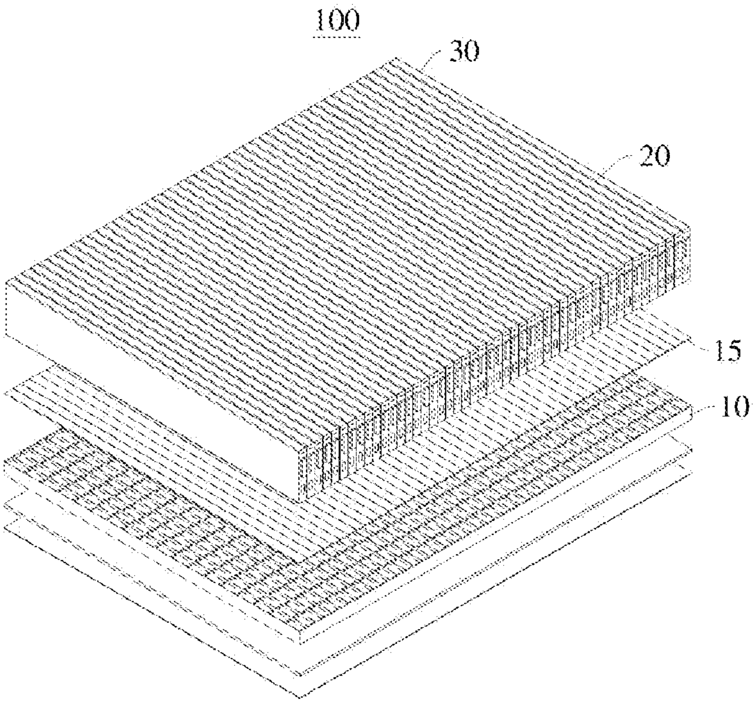
FIG. 2 is an exploded view of a battery cell, a structural adhesive, and a first cell support structure according to an embodiment of this application.

In some embodiments of this application, as shown in FIG. 1 and FIG. 2, the battery cell unit 30 may be bonded to the first cell support structure 10. Further, the battery cell unit 30 may be bonded to the first support body 11 of the first cell support structure 10 through the structural adhesive 15. With such an arrangement, the battery cell unit 30 can be reliably mounted on the first cell support structure 10, so that the battery cell unit 30 can be kept from moving.

In some embodiments of this application, as shown in FIG. 1 and FIG. 2, the battery cell unit 30 may include a plurality of battery cells 20. The plurality of battery cells 20 may be sequentially arranged in a thickness direction of the battery cell 20. Extension directions of the plurality of battery cells 20 are the same. Such an arrangement can make the plurality of battery cells 20 disposed on the first cell support structure 10 in an orderly manner, so that more battery cells 20 can be mounted on the first cell support structure 10.

Figure 6:
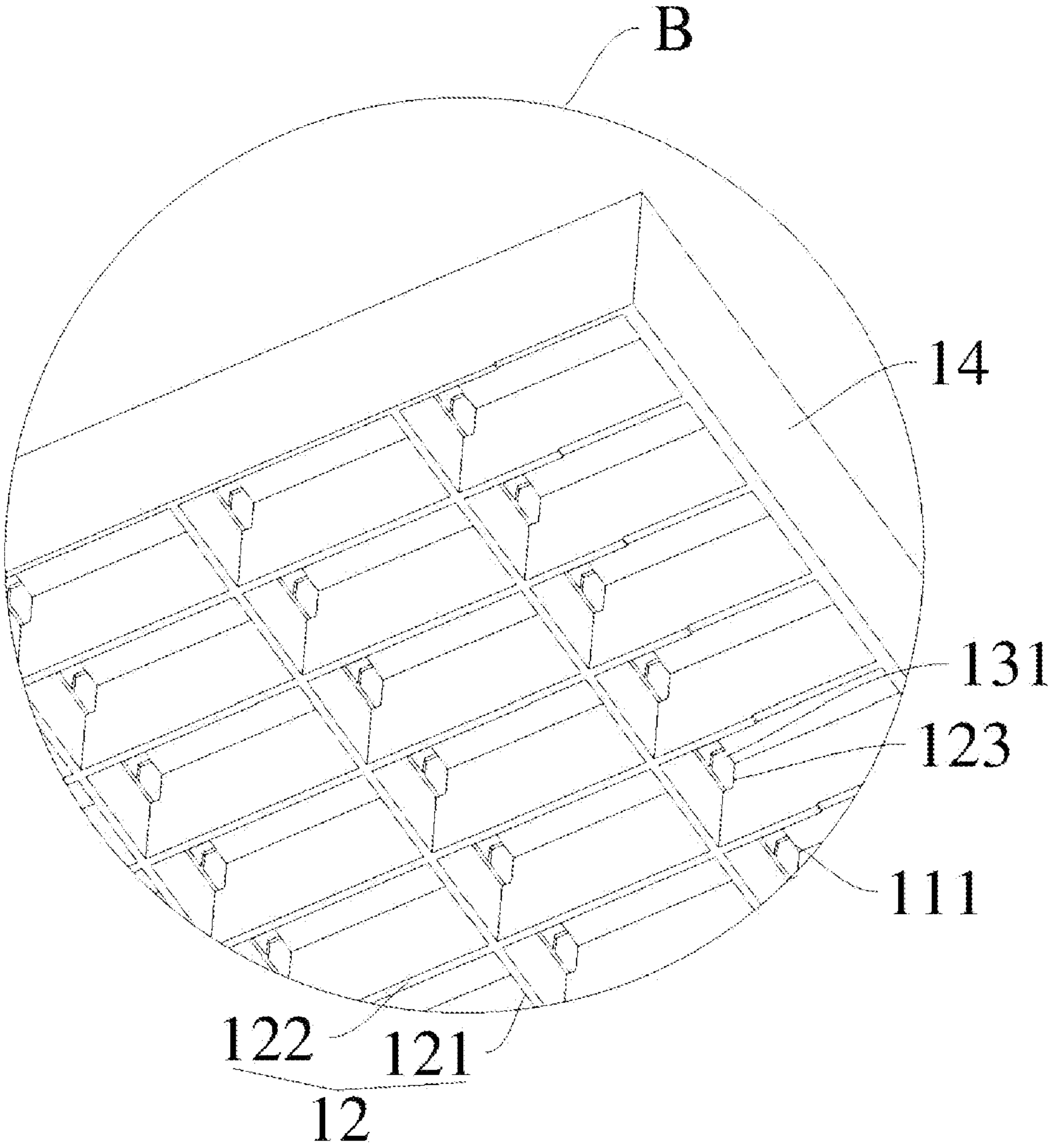
FIG. 6 is an enlarged view of B in FIG. 5.
Figure 7:
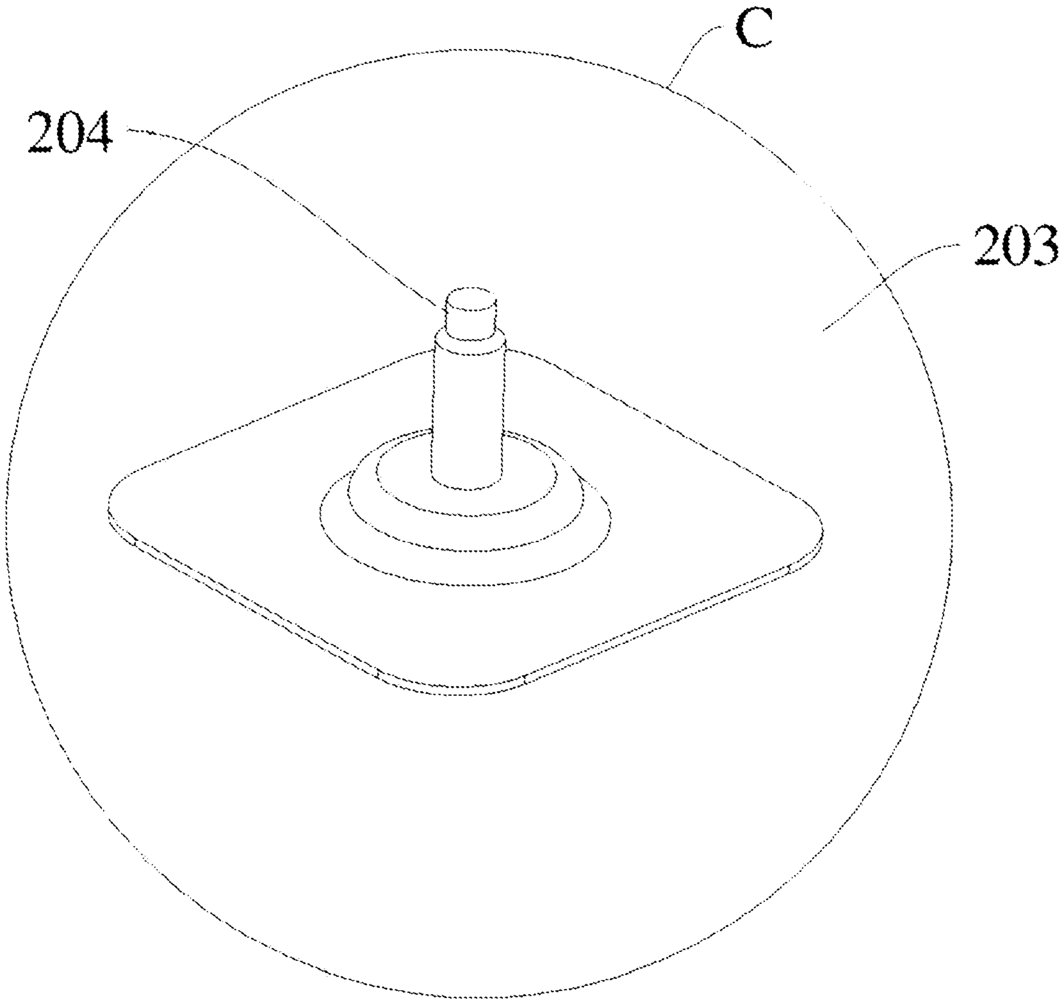
FIG. 7 is an enlarged view of C in FIG. 1.

In some embodiments of this application, as shown in FIG. 6, in the thickness direction of the first support body 11, the first bottom support rib 12 and the avoidance groove 111 are spaced apart. When the first cell support structure 10 supports the battery cell 20, with such an arrangement, a sufficient gap can be provided between the first bottom support rib 12 and the battery cell 20. When the first bottom support rib 12 of the first cell support structure 10 is impacted, the first bottom support rib 12 can be effectively kept from transferring the impact force to the battery cell 20, so that an impact force on the battery cell 20 can be further reduced. In this way, the use safety of the battery module 100 and the battery pack 1000 can be further improved, and the service life of the battery module 100 and the battery pack 1000 can be further extended.

In some embodiments of this application, as shown in FIG. 6, the first bottom support rib 12 may include a first lower support rib 121. Extension directions of the first lower support rib 121 and the avoidance groove 111 are the same. The first lower support rib 121 corresponds to the avoidance groove 111 in the thickness direction of the first support body 11 and is spaced apart from the avoidance groove 111. Further, the first cell support structure 10 may further include a side surrounding plate 14. The side surrounding plate 14 is sleeved at a circumferential edge of the first support body 11. Further, the circumferential edge of the first support body 11 is connected to a central position of the side surrounding plate 14. The side surrounding plate 14 may be integrally formed with the first support body 11. At least one end of the first lower support rib 121 is connected to the side surrounding plate 14. The first lower support rib 121 and the avoidance groove 111 may both extend in a length direction of the first cell support structure 10. Certainly, the first lower support rib 121 and the avoidance groove 111 may both extend in a width direction of the first cell support structure 10. Preferably, the first lower support rib 121 and the avoidance groove 111 both extend in the length direction of the first cell support structure 10. The length direction of the first cell support structure 10 is a longitudinal direction in FIG. 5. The extension direction of the first lower support rib 121 is perpendicular to the extension direction of the battery cell 20. With such an arrangement, it can be ensured that the first lower support rib 121 and the avoidance groove 111 are disposed right opposite to each other, so that an impact force can be kept from being transferred to the battery cell 20 through the first lower support rib 121.

In some embodiments of this application, as shown in FIG. 6, the first bottom support rib 12 may further include a second lower support rib 122. The second lower support rib 122 is provided on a surface of the first support body 11 away from the battery cell unit 30. The second lower support rib 122 and the first lower support rib 121 are disposed in an intersected manner. At least one end of the second lower support rib 122 is connected to the side surrounding plate 14. The second lower support rib 122 may be integrally formed with the first support body 11. Through the intersected arrangement of the second lower support rib 122 and the first lower support rib 121, the second lower support rib 122 can support the first lower support rib 121, so that the structural strength of the second lower support rib 122 can be improved. In this way, the deformation and energy absorption capability of the second lower support rib 122 can be improved, and the impact force on the battery cell 20 can be further reduced.

In some embodiments of this application, as shown in FIG. 6, the first lower support rib 121 and the second lower support rib 122 are disposed perpendicular to each other. For example, the first lower support rib 121 is disposed extending in the length direction of the first cell support structure 10. The second lower support rib 122 is disposed extending in the width direction of the first cell support structure 10. The length direction of the first cell support structure 10 is the longitudinal direction in FIG. 5. The width direction of the first cell support structure 10 is a transverse direction in FIG. 5. An extension direction of the second lower support rib 122 is the same as the extension direction of the battery cell 20. Further, the first lower support rib 121 and the second lower support rib 122 are both configured as plate-shaped structures. The first lower support rib 121 is integrally formed with the second lower support rib 122. With such an arrangement, the second lower support rib 122 can better support the first lower support rib 121, so that the deformation and energy absorption capability of the second lower support rib 122 can be further improved, and the impact force on the battery cell 20 can be further reduced.

In some embodiments of this application, as shown in FIG. 6, the second lower support rib 122 is provided with a first avoidance notch 123 in communication with the avoidance groove 111. In the thickness direction of the first support body 11, the first avoidance notch 123 is disposed to correspond to both the avoidance groove 111 and the first lower support rib 121. Preferably, the first avoidance notch 123 is disposed right opposite to both the avoidance groove 111 and the first lower support rib 121. The first avoidance notch 123 is provided at an end portion of the second lower support rib 122 close to the first support body 11. With such an arrangement, it can be ensured that a sufficient gap is provided between the first lower support rib 121 and the battery cell 20, so that the energy absorption effect of the first cell support structure 10 can be improved, and the impact force can be further kept from acting on the battery cell 20.

Figure 3:
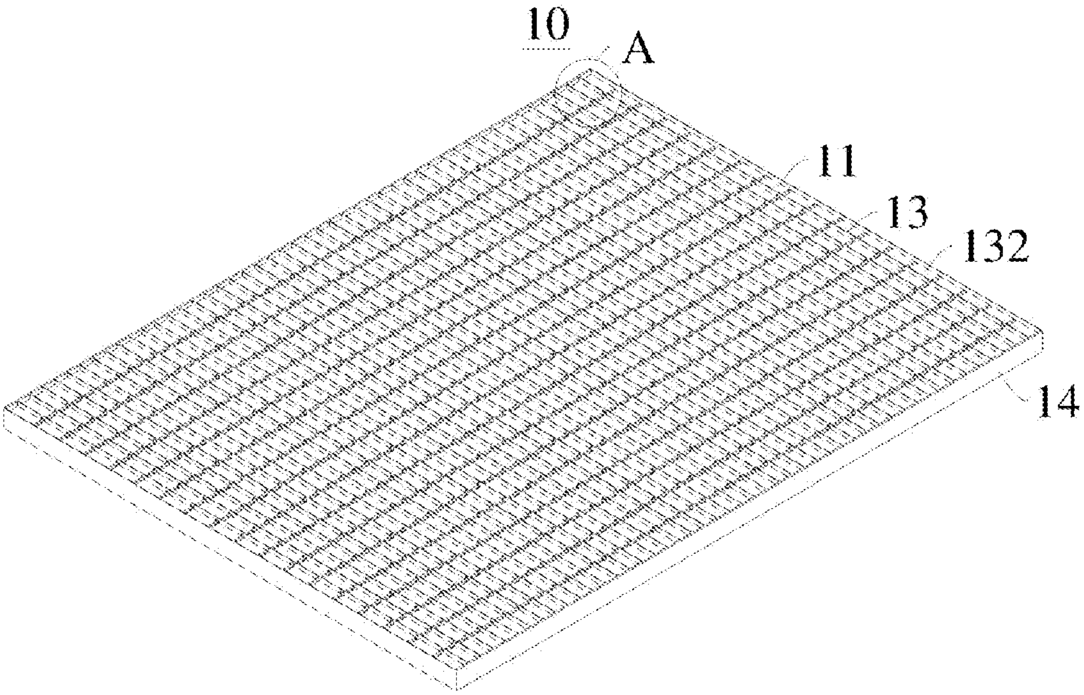
FIG. 3 is a schematic diagram of a first cell support structure according to an embodiment of this application.
Figure 4:
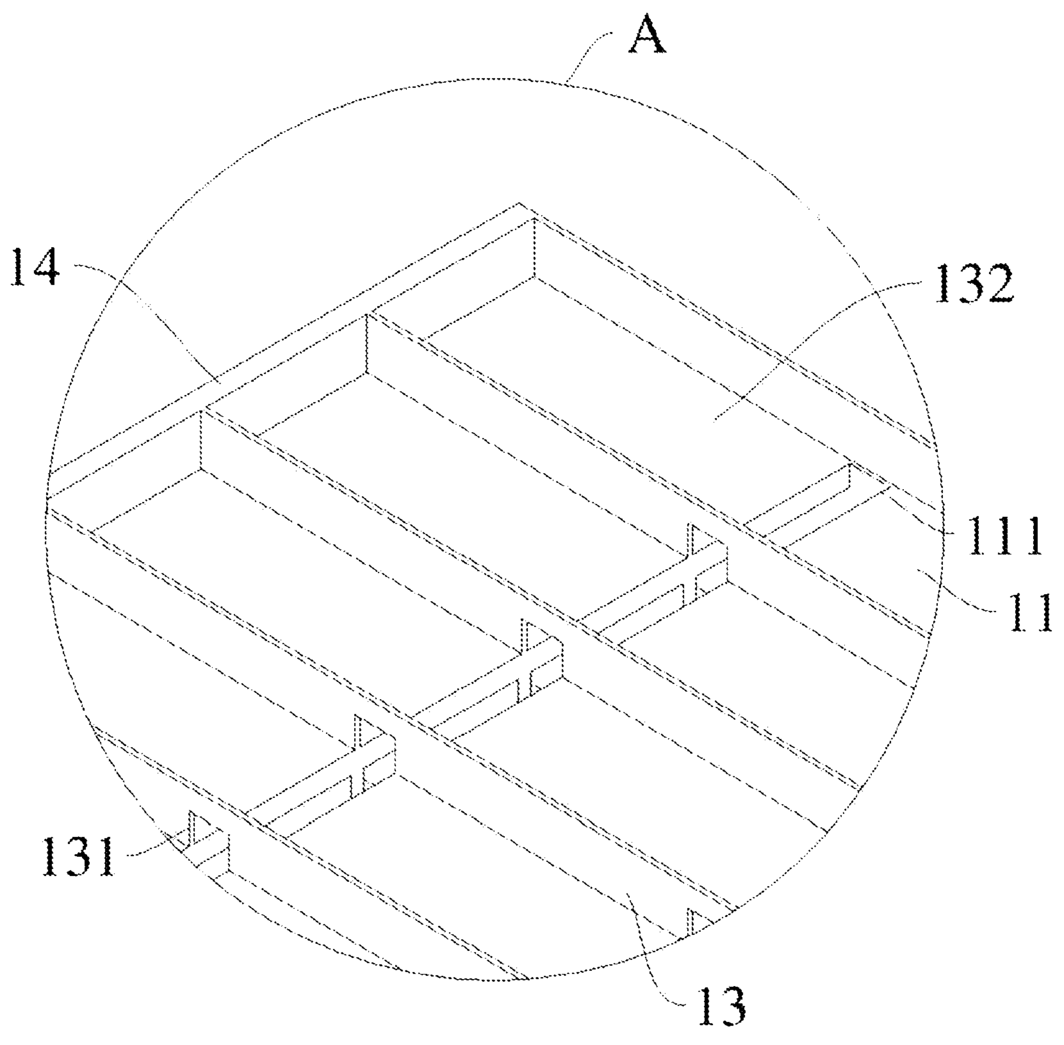
FIG. 4 is an enlarged view of A in FIG. 3.
Figure 5:
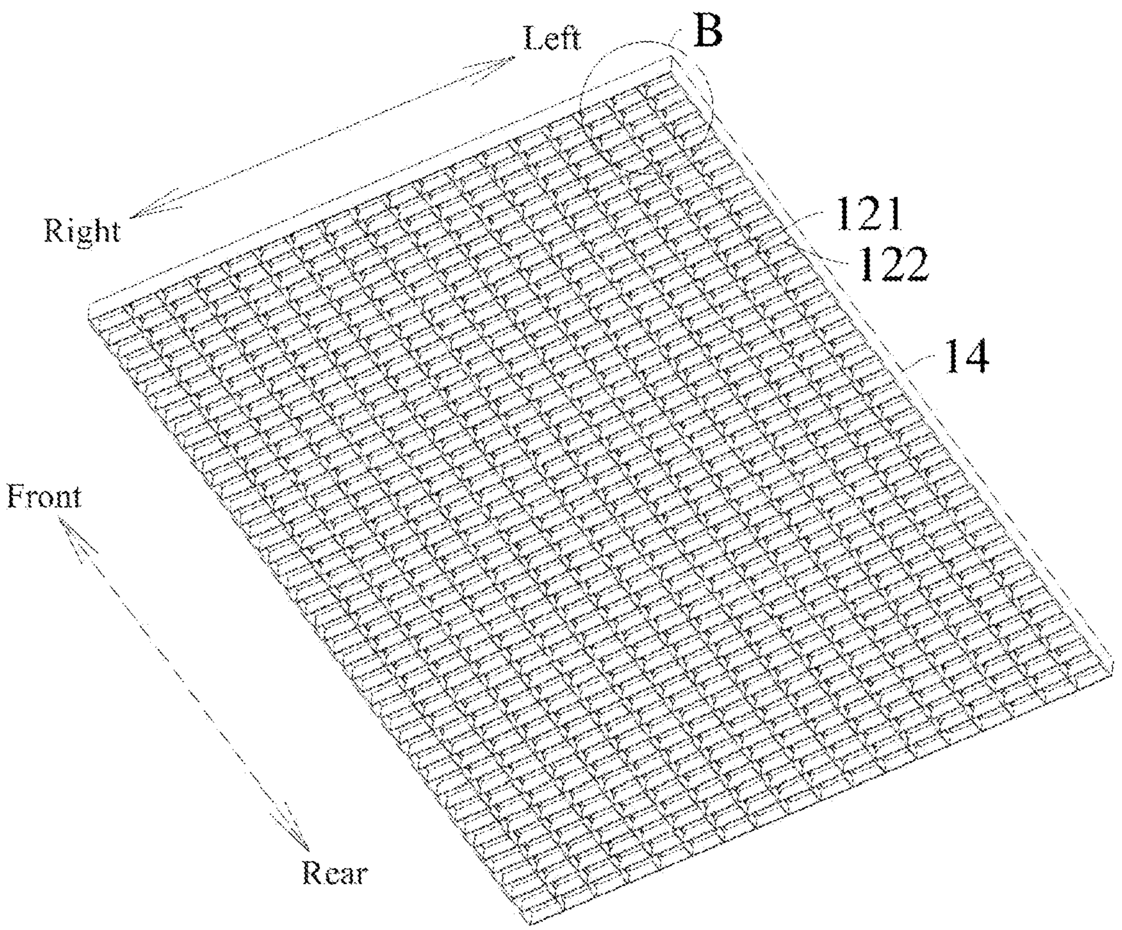
FIG. 5 is a schematic diagram of a first cell support structure from another angle according to an embodiment of this application.

In some embodiments of this application, as shown in FIG. 3 and FIG. 4, the first cell support structure 10 may further include a first upper support rib 13. The first upper support rib 13 is provided on a surface of the first support body 11 close to the battery cell unit 30. The first upper support rib 13 is disposed on the surface of the first support body 11 close to the battery cell unit 30. The first upper support rib 13 is provided between two adjacent battery cells 20. Further, the first upper support rib 13 is configured to be sandwiched between two adjacent battery cells 20 of the battery module 100. At least one end of the first upper support rib 13 is connected to the side surrounding plate 14. An extension direction of the first upper support rib 13 is the same as the extension direction of the battery cell 20. The battery module 100 may include the plurality of battery cells 20. The plurality of battery cells 20 may all disposed to be rectangular. The plurality of battery cells 20 may be sequentially arranged in the length direction of the first cell support structure 10. A plurality of first upper support ribs 13 may also be disposed. The plurality of first upper support ribs 13 are sequentially spaced apart in an arrangement direction of the battery cell 20. That is, the plurality of first upper support ribs 13 are sequentially spaced apart in the length direction of the first cell support structure 10, so that the first cell support structure 10 is divided into a plurality of cell placement grooves 132. The battery cell placement grooves 132 are in communication with the avoidance groove 111. One battery cell 20 is mounted in each cell placement groove 132. One first upper support rib 13 may be provided between two adjacent battery cells 20. With such an arrangement, the first cell support structure 10 can limit the battery cell 20, so that the battery cell 20 is stably mounted on the first cell support structure 10, and the battery cell 20 can be kept from moving.

Further, the first upper support rib 13 may be configured as a plate-shaped structure. A thickness of each first upper support rib 13 is smaller than a gap between two adjacent battery cells 20. An interval distance between two adjacent first upper support ribs 13 is larger than a thickness of the battery cell 20. With such an arrangement, it is ensured that the battery cell 20 may be mounted in the battery cell placement groove 132.

In some embodiments of this application, as shown in FIG. 6, the first upper support rib 13 and the second lower support rib 122 are disposed opposite to each other in the thickness direction of the first support body 11. Preferably, the first upper support rib 13 and the second lower support rib 122 are disposed right opposite to each other in the thickness direction of the first support body 11. The first upper support rib 13 is provided with a second avoidance notch 131. The second avoidance notch 131 is disposed to correspond to the avoidance groove 111. The second avoidance notch 131 is provided at an end portion of the first upper support rib 13 opposite to the first support body 11. The second avoidance notch 131 and the avoidance groove 111 are disposed right opposite to each other. With Such an arrangement, a contact area between the first upper support rib 13 and the battery cell 20 can be reduced, to reduce the transfer of a force from the first upper support rib 13 to the battery cell 20, so that a force on the battery cell 20 can be further reduced. In this way, the service life of the battery cell 20 can be extended, and the energy absorption capability of the first cell support structure 10 can be improved.

As shown in FIG. 7 to FIG. 9 and FIG. 13 to FIG. 18, a battery pack 1000 according to a second embodiment of this application includes the housing 200 and the battery module 100. The battery module 100 is provided in the housing 200.

As shown in FIG. 7 to FIG. 9 and FIG. 13 to FIG. 18, the housing 200 includes the upper housing 203 and the lower housing 201. The upper housing 203 is connected to the lower housing 201. The upper housing 203 and the lower housing 201 jointly define the mounting cavity 205 for mounting the battery module 100 of the battery pack 1000. The battery module 100 is mounted in the mounting cavity 205. The housing 200 is provided with the vehicle body mounting member 204. Specifically, the upper housing 203 is provided with the vehicle body mounting member 204. The vehicle body mounting member 204 is configured to be connected to the vehicle body mounting structure 300 of the vehicle. The housing 200 is configured as the vehicle body floor of the vehicle. Specifically, the upper housing 203 is configured as the vehicle body floor of the vehicle.

It needs to be noted that the vehicle body mounting structure 300 may be the chassis structure of the vehicle. The vehicle body mounting structure 300 may include structures such as a threshold beam. The vehicle body mounting member 204 may be disposed as a bolt, and the bolt is connected to the vehicle body mounting structure 300. However, this application is not limited thereto. The vehicle body mounting member 204 may be clamped or welded to the vehicle body mounting structure 300. The vehicle body mounting member 204 is connected to the vehicle body mounting structure 300. The battery pack 1000 can be mounted on the vehicle body mounting structure 300. In addition, the upper housing 203 is configured as the vehicle body floor, and the arrangement of the vehicle body floor can be omitted. A vehicle body floor does not need to be independently disposed on a vehicle, so that a weight of the vehicle can be reduced. Moreover, an integration level of a battery pack and a vehicle body can be improved, and the utilization of a height space of the vehicle is facilitated.

In this way, the housing 200 is configured as the vehicle body floor, and the housing 200 can replace the vehicle body floor. Compared with the prior art, the vehicle body floor does not need to be independently disposed on the vehicle, so that an integration level of the battery pack 1000 and the vehicle body can be improved, the utilization of the height space of the vehicle is facilitated, and the weight of the vehicle can be further reduced.

In some embodiments of this application, the vehicle body mounting member 204 is threaded to the vehicle body mounting structure 300. A plurality of vehicle body mounting members 204 may be disposed. The plurality of vehicle body mounting members 204 may all be disposed as bolts. The bolts may be integrally formed with the upper housing 203, and the bolts are threadedly connected to the vehicle body mounting structure 300 to reliably assemble the battery pack 1000 on the vehicle body mounting structure 300, to keep the battery pack 1000 from falling off the vehicle body mounting structure 300. The vehicle body mounting member 204 is threaded to the vehicle body mounting structure 300, making it convenient to detach the battery pack 1000 from the vehicle body mounting structure 300 and also making it convenient to mount the battery pack 1000 on the vehicle body mounting structure 300.

In some embodiments of this application, as shown in FIG. 13, FIG. 8, FIG. 11, and FIG. 12, the upper housing 203 is provided with a seat mounting member 206, and the seat mounting member 206 is used for mounting a seat 301 of the vehicle. Further, in a height direction of the vehicle, the seat mounting member 206 may be disposed to correspond to a front seat 301 of the vehicle. The seat mounting member 206 may be used for mounting the front seat 301 of the vehicle. Such an arrangement can achieve the objective of mounting the seat 301 using the battery pack 1000, so that the seat 301 can be reliably mounted on the housing 200 of the battery pack 1000.

In some embodiments of this application, as shown in FIG. 8, the seat mounting member 206 may include a seat mounting support 2061. A nut 2062 is provided in the seat mounting support 2061. The nut 2062 is configured to be connected to the seat 301. The seat mounting support 2061 is mounted on the upper housing 203. The seat 301 may be disposed with a bolt. Through a connection between the bolt and the nut 2062, the seat 301 may be reliably mounted on the seat mounting member 206. However, this application is not limited thereto. The seat mounting member 206 and the seat 301 may be connected to each other in another manner. For example, the seat mounting member 206 is clamped to the seat 301. The seat mounting member 206 and the seat 301 may be alternatively welded.

In some embodiments of this application, as shown in FIG. 8, the seat mounting support 2061 may include a mounting body 2063 and a mounting flange 2064. The mounting flange 2064 is connected to the upper housing 203. The nut 2062 is disposed on the mounting body 2063. The mounting body 2063 and the upper housing 203 are spaced apart. The mounting body 2063 and the upper housing 203 are spaced apart, so that an avoidance space can be formed between the mounting body 2063 and the upper housing 203. When the nut 2062 is connected to the bolt, the avoidance space can avoid the bolt, so that it can be ensured that the seat 301 is reliably mounted on the housing 200. In addition, the mounting flange 2064 is connected to the upper housing 203, and the mounting flange 2064 has a plate-shaped structure, so that a contact area between the seat mounting support 2061 and the upper housing 203 can be increased, and the seat mounting support 2061 can be stably mounted on the upper housing 203.

In some embodiments of this application, as shown in FIG. 13 and FIG. 9, the upper housing 203 is provided with a high-voltage output plug-in 207 and a low-voltage output plug-in 202. The high-voltage output plug-in 207 is configured to be connected to an output terminal of the battery module 100. The low-voltage output plug-in 202 is configured to be communicatively connected to a BMS mainboard 50 of the battery pack 1000. With such an arrangement, the battery pack 1000 can output high-voltage electricity through the high-voltage output plug-in 207, and can also implement communicative connection between the BMS mainboard 50 and the outside through the low-voltage output plug-in 202.

Further, as shown in FIG. 12, the high-voltage output plug-in 207 and/or the low-voltage output plug-in 202 is provided under a rear seat 301 of the vehicle. Preferably, the high-voltage output plug-in 207 and the low-voltage output plug-in 202 are both provided under the rear seat 301 of the vehicle. An electric appliance component 302 is disposed between the rear seat 301 of the vehicle and the battery pack 1000, so that it can be convenient to repair the electric appliance component 302. In addition, the high-voltage output plug-in 207 and the low-voltage output plug-in 202 are both configured to be connected to the electric appliance component 302 of the vehicle. It needs to be noted that, the electric appliance component 302 is disposed outside the battery pack 1000. The electric appliance component 302 may include structural members such as a power distribution unit of the vehicle and a distribution box of the battery pack 1000. The high-voltage output plug-in 207 may be connected to the power distribution unit. The low-voltage output plug-in 202 may be connected to the distribution box. The distribution box is disposed outside the battery pack 1000, so that an internal space of the battery pack 1000 can be saved, and the energy density of the battery pack 1000 can be improved.

In some embodiments of this application, as shown in FIG. 13 and FIG. 12, an upper connection flange 2031 is provided at a circumferential edge of the upper housing 203. A lower connection flange 2011 is provided at a circumferential edge of the lower housing 201. The upper connection flange 2031 and the lower connection flange 2011 form the connection flange in the foregoing embodiment. The upper connection flange 2031 and the lower connection flange 2011 are connected to each other in a sealed manner. Such an arrangement can improve the airtightness of the mounting cavity 205, and can keep dust and other foreign matter from entering the mounting cavity 205.

Further, as shown in FIG. 13 and FIG. 12, an upper connecting hole 2032 is provided on the upper connection flange 2031, and a lower connecting hole 2012 corresponding to the upper connecting hole 2032 is provided on the lower connection flange 2011. A fastening member (for example, a bolt) passes through both the upper connecting hole 2032 and the lower connecting hole 2012 and is configured to be connected to the vehicle body mounting structure 300. The fastening member may sequentially pass through the lower connection flange 2011 and the upper connecting hole 2032 to be connected to the vehicle body mounting structure 300. With such an arrangement, the battery pack 1000 can be stably mounted on the vehicle body mounting structure 300, and the battery pack 1000 can be kept from falling off.

In some embodiments of this application, the housing 200 may be provided with a repair hole and a repair cover. The repair hole is provided to correspond to the BMS mainboard 50. The repair cover is used for opening or closing the repair hole, to make it convenient to repair the BMS mainboard 50.

In some embodiments of this application, as shown in FIG. 12, the upper housing 203 is provided with a spacer 2033. The spacer 2033 is disposed to correspond to the upper connecting hole 2032. The spacer 2033 is used for limiting a position.

In some embodiments of this application, the battery module 100 is bonded to the lower housing 201 and/or the upper housing 203. Preferably, the battery module 100 may be bonded to the lower housing 201 and the upper housing 203 by the structural adhesive 15, to fix the battery module 100 in the housing 200.

The battery module 100 according to an embodiment of this application includes a prismatic battery cell 20, a second heat exchange structure 404, and a second cell support structure 400. The battery cell 20 is sandwiched in the second heat exchange structure 404. The second heat exchange structure 404 may contact the battery cell 20. The second heat exchange structure 404 is used for performing heat exchange with the battery cell 20.

As shown in FIG. 13, the battery module 100 may be provided with the second cell support structure 400. The battery module 100 includes at least one battery cell 20. The battery module 100 may be mounted in the housing 200 of the battery pack 1000.

As shown in FIG. 13 to FIG. 17 and FIG. 18, the second cell support structure 400 includes a second support body 401 and a second bottom support rib 402. The second support body 401 is used for supporting the battery cell 20. Further, the battery cell 20 is disposed on an upper surface of the second support body 401. The second bottom support rib 402 is connected to the second support body 401 and is located on a side of the second support body 401 away from the battery cell 20. For example, the battery cell 20 is disposed on the upper surface of the second support body 401. The second bottom support rib 402 is disposed on a lower surface of the second support body 401.

The battery module 100 may be provided with the second cell support structure 400. In this case, the second cell support structure 400 is a structure of the battery module 100. However, this application is not limited thereto. The second cell support structure 400 may be disposed as an independent part. Preferably, the second cell support structure 400 is the structure of the battery module 100. When the second cell support structure 400 supports the battery cell 20, the second cell support structure 400 performs cushioning. The battery module 100 is mounted in the housing 200 of the battery pack 1000. The second cell support structure 400 is supported under the battery cell 20. Further, the second cell support structure 400 is supported between the battery cell 20 and the housing 200 (the lower housing 200). When the bottom of the housing 200 of the battery pack 1000 is impacted, because the second bottom support rib 402 deforms and absorbs energy, the second cell support structure 400 can absorb the impact force, and can reduce the impact force on the battery cell 20, so that the use safety of the battery module 100 and the battery pack 1000 can be improved, and the service life of the battery module 100 and the battery pack 1000 can be extended. In addition, when the impact force is transferred to the second bottom support rib 402, the second bottom support rib 402 can transfer the impact force to different regions of the battery module 100, so that a single battery cell 20 can be prevented from an excessively large force, and the battery cell 20 in the battery module 100 is subjected to a uniform force.

In this way, the second bottom support rib 402 is disposed, and the second cell support structure 400 is mounted in the housing 200 of the battery pack 1000 to support the battery cell 20. When the bottom of the housing 200 of the battery pack 1000 is impacted, the second cell support structure 400 performs cushioning. The second cell support structure 400 can absorb an impact force, and can reduce the impact force on the battery cell unit 20, so that the use safety of the battery module 100 and the battery pack 1000 can be improved, and the service life of the battery module 100 and the battery pack 1000 can be extended. In addition, the second bottom support rib 402 can transfer the impact force to the entire battery module 100, so that a single battery cell 20 can be prevented from an excessively large force, and the battery cell 20 in the battery module 100 is subjected to a uniform force.

Figure 18:
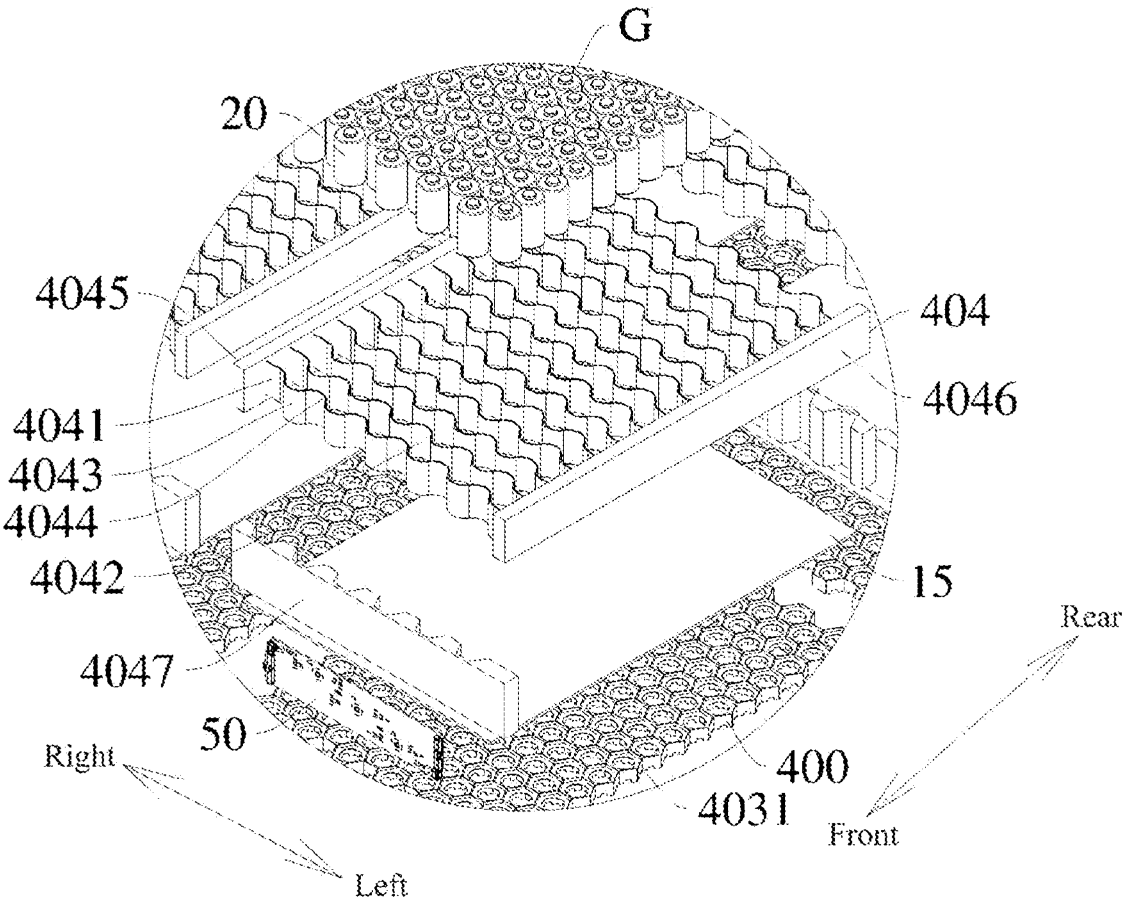
FIG. 18 is an enlarged view of G in FIG. 13.

In some embodiments of this application, as shown in FIG. 13 and FIG. 18, opposite end portions of the battery cell 20 and the second cell support structure 400 are bonded to the second support body 401. Further, the battery cell 20 is bonded to the second support body 401 through the structural adhesive 15. With such an arrangement, the battery cell 20 and the second cell support structure 400 can be stably assembled together, so that the battery cell 20 can be kept from moving relative to the second cell support structure 400*s*.

In some embodiments of this application, as shown in FIG. 18, the second heat exchange structure 404 may include a plurality of heat exchange plates 4041. Coolant flow paths may be defined in the heat exchange plate 4041. A coolant may flow in the coolant flow paths. The plurality of heat exchange plates 4041 are sequentially spaced apart in the length direction of the battery module 100. A sandwiching space 4042 may be formed between every two adjacent heat exchange plates 4041. The battery cell 20 is sandwiched in the sandwiching space 4042. The length direction of the battery module 100 is a longitudinal direction in FIG. 18. The battery cell 20 is mounted in the sandwiching space 4042. The battery cell 20 can perform heat exchange with the heat exchange plates 4041 on two side, so that a contact area between the heat exchange plate 4041 and the battery cell 20 can be increased. In this way, heat dissipation can be better performed on the battery cell 20, and the battery cell 20 can be kept at an appropriate working temperature.

In some embodiments of this application, as shown in FIG. 18, each heat exchange plate 4041 may include a first arc-shaped portion 4043 and a second arc-shaped portion 4044 that are connected to each other. The first arc-shaped portion 4043 and the second arc-shaped portion 4044 both extend in the length direction of the heat exchange plate 4041. The length direction of the heat exchange plate 4041 is a transverse direction in FIG. 18. In the length direction of the battery module 100, a recessing direction of the first arc-shaped portion 4043 and a recessing direction of the second arc-shaped portion 4044 are opposite to each other. Further, as shown in FIG. 18, the first arc-shaped portion 4043 is recessed toward the front of the heat exchange plate 4041, and the second arc-shaped portion 4044 is recessed toward the rear of the heat exchange plate 4041. In addition, the first arc-shaped portion 4043 and the second arc-shaped portion 4044 of one heat exchange plate 4041 from every two adjacent heat exchange plates 4041 are respectively disposed to correspond to the first arc-shaped portion 4043 and the second arc-shaped portion 4044 of the other heat exchange plate 4041 from the two adjacent heat exchange plates 4041. One battery cell 20 may be provided between two first arc-shaped portions 4043 of every two adjacent heat exchange plates 4041. One battery cell 20 may be provided between two second arc-shaped portions 4044 of two adjacent heat exchange plates 4041. With such an arrangement, the heat exchange plate 4041 can be configured as a serpentine structure. After the battery cell 20 is mounted between every two adjacent heat exchange plates 4041, the heat exchange plate 4041 may limit the battery cell 20, so that the position of the battery cell 20 is more stable.

In some embodiments of this application, as shown in FIG. 18, the second heat exchange structure 404 may further include a first side plate 4045 and a second side plate 4046. Two ends of each heat exchange plate 4041 are respectively connected to the first side plate 4045 and the second side plate 4046, and the two ends of each heat exchange plate 4041 are respectively in communication with the first side plate 4045 and the second side plate 4046. Coolant flow paths may be defined in both the first side plate 4045 and the second side plate 4046, so that the two ends of each heat exchange plate 4041 are respectively in communication with the first side plate 4045 and the second side plate 4046.

Further, one of the first side plate 4045 and the second side plate 4046 may be provided with a coolant inlet, and the other of the first side plate 4045 and the second side plate 4046 may be provided with a coolant outlet, so that a coolant can circulate in the second heat exchange structure 404.

In some embodiments of this application, as shown in FIG. 18, the battery module 100 may further include an end plate 4047. Two ends of the first side plate 4045 and two ends of the second side plate 4046 are both connected to the end plate 4047; and/or the end plate 4047 is connected to the second cell support structure 400. Further, as shown in FIG. 18, a front end of the first side plate 4045 and a front end of the second side plate 4046 are connected to a same end plate 4047. A rear end of the first side plate 4045 and a rear end of the second side plate 4046 are connected to a same end plate 4047. In addition, the end plate 4047 is connected to the second cell support structure 400. With such an arrangement, the structure of the battery module 100 can be assembled fixedly, so that the stability of the structure of the battery module 100 can be improved.

In some embodiments of this application, as shown in FIG. 18, the battery module 100 may further include a BMS mainboard 50. The BMS mainboard 50 is connected to the low-voltage output plug-in 202 of the battery pack 1000 by a bundle. The BMS mainboard 50 is provided on the end plate 4047 or the first side plate 4045 or the second side plate 4046. Preferably, the BMS mainboard 50 is provided on the end plate 4047. The BMS mainboard 50 may be mounted on the end plate 4047 in a bonded manner, or the BMS mainboard 50 may be mounted on the end plate 4047 by a bolt, or the BMS mainboard 50 may be clamped on the end plate 4047. The BMS mainboard 50 is disposed on the end plate 4047, so that the BMS mainboard 50 can be integrated on the battery module 100. An overall structure of the battery module 100 and the BMS mainboard 50 is compact. After the battery module 100 is mounted in the housing 200, the BMS mainboard 50 can be kept from occupying another position or space of the battery pack 1000, so that space utilization in the battery pack 1000 can be improved.

Figure 16:
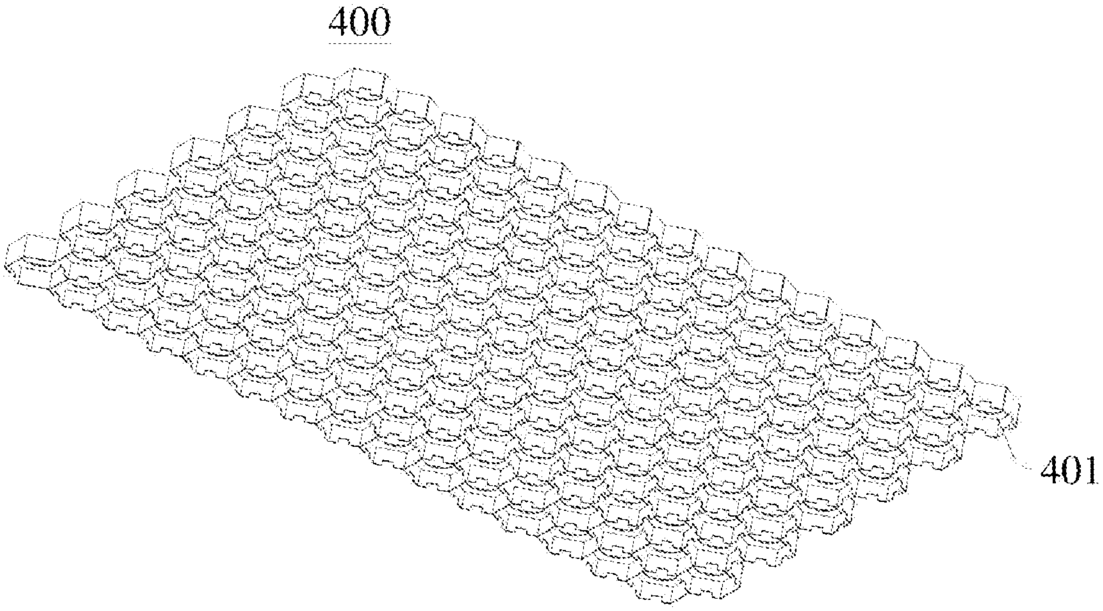
FIG. 16 is a schematic diagram of a second cell support structure from another angle according to an embodiment of this application.
Figure 17:
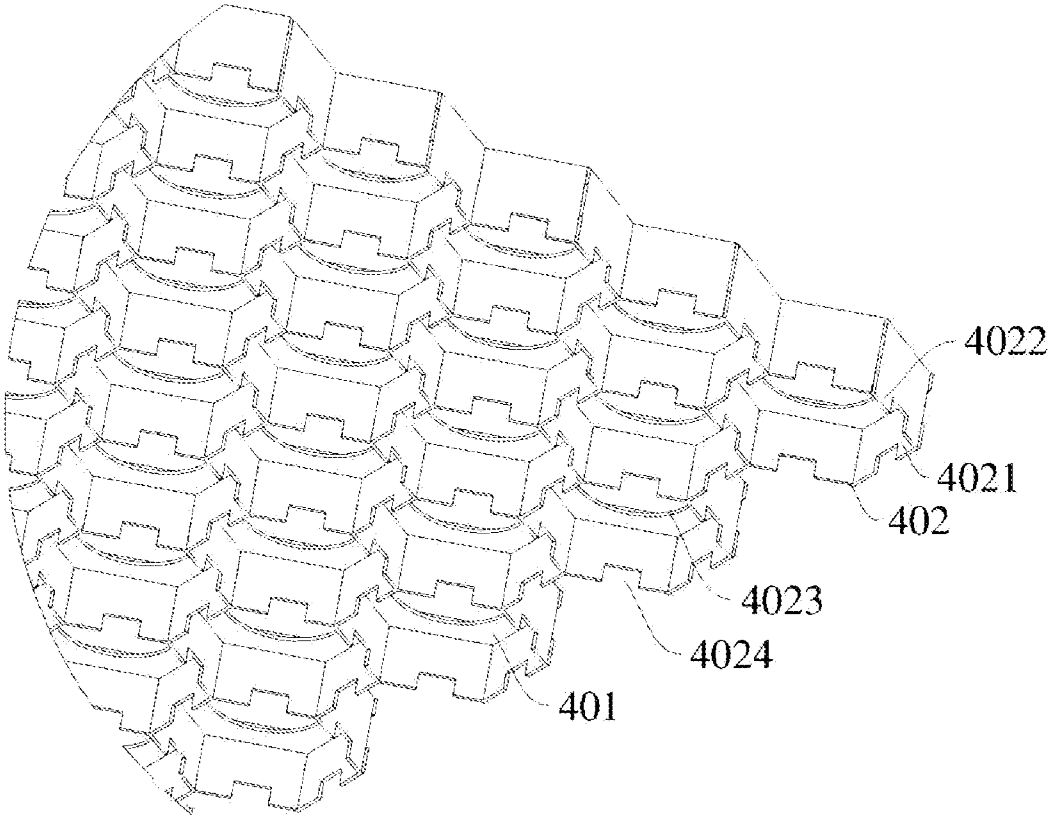
FIG. 17 is a partial enlarged view of the second cell support structure in FIG. 16.

In some embodiments of this application, as shown in FIG. 16 and FIG. 17, the second bottom support rib 402 and the second support body 401 jointly define a cushioning space 4021, and the cushioning space 4021 is disposed to correspond to the battery cell 20 in a thickness direction of the second support body 401. The thickness direction of the second support body 401 is a vertical direction in FIG. 13. When a force transferred to the second bottom support rib 402, the cushioning space 4021 can avoid the second bottom support rib 402. The second bottom support rib 402 can deform and absorb energy, so that the energy absorption effect of the second bottom support rib 402 can be ensured, and the force on the battery cell 20 can be reduced.

In some embodiments of this application, as shown in FIG. 13, FIG. 16, and FIG. 17, a plurality of cushioning spaces 4021 and a plurality of battery cells 20 are provided. In the thickness direction of the second support body 401, the plurality of cushioning spaces 4021 and the plurality of battery cells 20 are disposed in a one-to-one correspondence. The battery cell 20 may be a prismatic battery cell 20. Preferably, the battery cell 20 is a cylindrical battery cell 20. One battery cell 20 is provided to correspond to one cushioning space 4021. With such an arrangement, an arrangement area of the second bottom support rib 402 can be increased. When a force is applied to the second bottom support rib 402, the second bottom support rib 402 may transfer the force to the entire battery module 100, so that the battery module 100 can be subjected to a more uniform force.

In some embodiments of this application, as shown in FIG. 16 and FIG. 17, the second bottom support rib 402 includes at least one support rib unit 4022, and each support rib unit 4022 together with the second support body 401 jointly define one cushioning space 4021. With such an arrangement, an objective of defining the cushioning space 4021 can be achieved, and the working performance of the second bottom support rib 402 can be ensured.

Further, as shown in FIG. 17, the second bottom support rib 402 includes a plurality of support rib units 4022, and every two adjacent support rib units 4022 are connected to each other. Further, any two adjacent support rib units 4022 are connected to each other. Further, in a radial direction of the second cell support structure 400, a cross-sectional shape of the support rib unit 4022 is a polygon. For example, the cross-sectional shape of the support rib unit 4022 is a hexagon. Every two adjacent support rib units 4022 have an overlapping region. With such an arrangement, every two adjacent support rib units 4022 can be connected together, and when a force is transferred to the second bottom support rib 402, it can be ensured that the force is transferred between the plurality of support rib units 4022. In this way, it can be ensured that the force is transferred to the entire battery module 100, so that a single battery cell 20 can be further prevented from an excessively large force, and the battery cell 20 in the battery module 100 is subjected to a uniform force.

Figure 15:
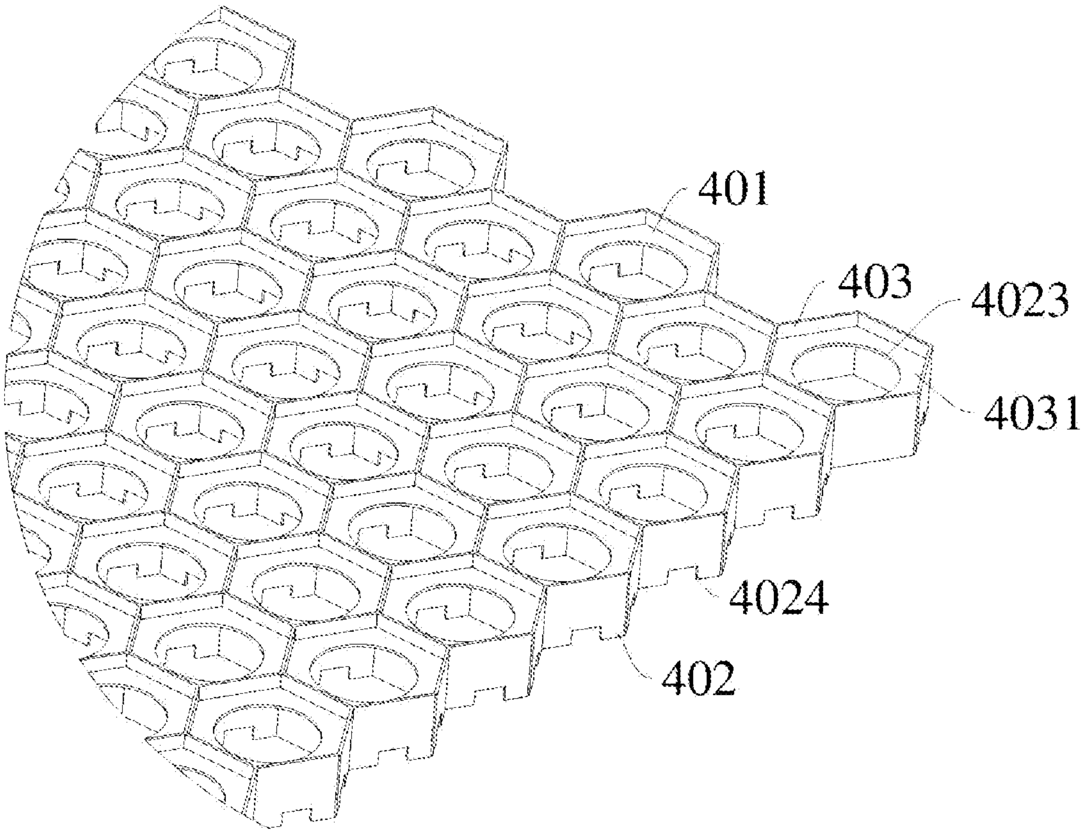
FIG. 15 is a partial enlarged view of the second cell support structure in FIG. 14.

In some embodiments of this application, as shown in FIG. 15 and FIG. 17, the second support body 401 is provided with an avoidance hole 4023 penetrating the second support body 401. The avoidance hole 4023 is disposed to correspond to the cushioning space 4021. The avoidance hole 4023 is in communication with the cushioning space 4021. The battery cell 20 is provided with an explosion relief valve. The explosion relief valve of the battery cell 20 is disposed to correspond to the avoidance hole 4023. When the second cell support structure 400 supports the battery cell 20, the explosion relief valve of the battery cell 20 is disposed to correspond to the avoidance hole 4023. During discharge of a gas from the battery cell 20, the avoidance hole 4023 flows into the cushioning space 4021, to implement gas discharge.

Further, each support rib unit 4022 is provided with a gas discharge notch 4024 in communication with the cushioning space 4021. The gas discharge notch 4024 is a gas discharge channel. The gas discharge notch 4024 may be disposed at an end portion of the support rib unit 4022 away from the second support body 401. After a gas in the battery cell 20 flows into the cushioning space 4021 through the avoidance hole 4023, a gas in the cushioning space 4021 may be discharged through the gas discharge notch 4024.

Figure 14:
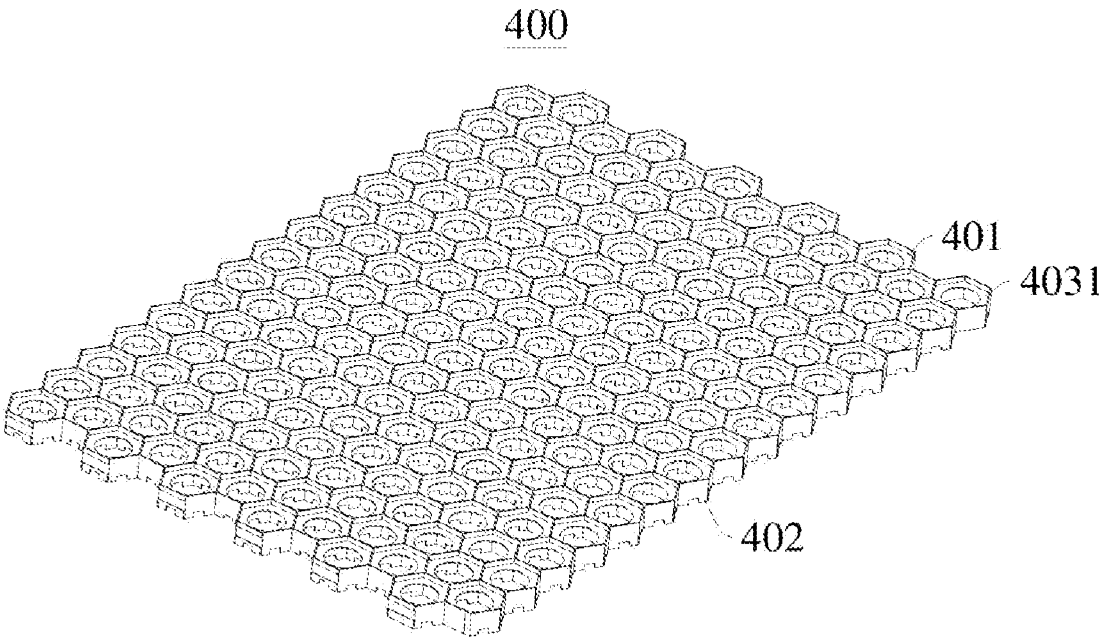
FIG. 14 is a schematic diagram of a second cell support structure according to an embodiment of this application.

In some embodiments of this application, as shown in FIG. 14 and FIG. 15, the second cell support structure 400 may further include a second upper support rib 403. The second upper support rib 403 is disposed on a surface of the second support body 401 close to the battery cell 20. The second upper support rib 403 and the second support body 401 jointly define a mounting space 4031 for mounting the battery cell 20. The second upper support rib 403 is configured to be sandwiched between two adjacent battery cells 20 of the battery module 100. An extension direction of the second upper support rib 403 is the same as the extension direction of the battery cell 20. Further, the second upper support rib 403 and the second support body 401 jointly define a plurality of mounting spaces 4031. In the radial direction of the second cell support structure 400, a cross-section of the mounting space 4031 is a polygon. For example, the cross-sectional shape of the mounting space 4031 is a hexagon. In the thickness direction of the second support body 401, one mounting space 4031 is disposed right opposite to one cushioning space 4021. When the battery cell 20 is mounted in the mounting space 4031, the second upper support rib 403 may be sandwiched between two adjacent battery cells 20. With such an arrangement, the second cell support structure 400 can limit the battery cell 20, so that the battery cell 20 can be stably mounted at the second cell support structure 400, and the battery cell 20 can be kept from moving.

Further, the second upper support rib 403 is disposed to surround the avoidance hole 4023. In the radial direction of the second cell support structure 400, the second upper support rib 403 is disposed on an outer side of the avoidance hole 4023. When the battery cell 20 is mounted in the mounting space 4031, it can be convenient to arrange the explosion relief valve of the battery cell 20 corresponding to the avoidance hole 4023.

As shown in FIG. 13, the battery cell 20 may be bonded to the second cell support structure 400 through the structural adhesive 15.

Further, the plurality of battery cells 20 of the battery module 100 are serially connected to each other by a busbar.

In some embodiments of this application, as shown in FIG. 13, the lower housing 201 is provided with a lower housing cross beam 2013. The lower housing cross beam 2013 is used for improving the mode and stiffness of the battery pack 1000. Further, the lower housing cross beam 2013 may be connected to a bottom wall and a side wall of the lower housing 201, so that the structural strength of the lower housing 201 can be improved.

It needs to be noted that, the structure of the housing 200 of the battery pack 1000 in the first embodiment is the same as the structure of the housing 200 of the battery pack 1000 in the second embodiment.

The vehicle according to the embodiments of this application includes the vehicle body floor assembly in the foregoing embodiments. The housing 200 is configured as the vehicle body floor, and the housing 200 can replace the vehicle body floor. Compared with the prior art, the vehicle body floor does not need to be independently disposed on the vehicle, so that an integration level of the battery pack 1000 and the vehicle body can be improved, the utilization of the height space of the vehicle is facilitated, and the weight of the vehicle can be further reduced.

In the description of the specification, the description with reference to terms "an embodiment", "some embodiments", "exemplary embodiments", "an example", "a specific example" or "some embodiments", and the like indicate that specific features, structures, materials or characteristics described with reference to the embodiments or examples are included in at least one embodiment or example of this application. In the specification, the schematic descriptions of the foregoing terms do not necessarily involve the same embodiments or examples. In addition, the described specific features, structures, materials or characteristics may be combined in an appropriate manner in any one or more embodiments or examples.

Although the embodiments of this application have been shown and described above, a person of ordinary skill in the art may understand that various changes, modifications, replacements, and variations may be made to these embodiments within the principle and concept of this application, and the scope of this application is as defined by the appended claims and equivalents thereof.

The invention claimed is:

1. A vehicle body floor assembly for a vehicle, comprising:

a vehicle body mounting structure; and a battery pack, the battery pack comprising a battery module and a housing, the battery module being provided in the housing, the housing being connected to the vehicle body mounting structure, and at least a portion of the structure of the housing being configured as a vehicle body floor of the vehicle;

wherein the battery module comprises a battery cell and a cell support structure, the cell support structure is supported between the battery cell and the housing, the cell support structure comprises a support body and a bottom support rib, the support body is used for supporting the battery cell, the bottom support rib is connected to the support body and is located on a side of the support body away from the battery cell, the bottom support rib is used for deforming and absorbing energy when impacted;

the support body is provided with an avoidance opening penetrating the support body, and the bottom support rib corresponds to the avoidance opening in a thickness direction of the support body.

2. The vehicle body floor assembly for a vehicle according to claim 1, wherein the housing is provided with a vehicle body mounting member, and the vehicle body mounting member is connected to the vehicle body mounting structure.

3. The vehicle body floor assembly for a vehicle according to claim 2, wherein the vehicle body mounting structure comprises a left threshold beam, a right threshold beam, and a cross beam, the cross beam is connected between the left threshold beam and the right threshold beam, and the vehicle body mounting member is connected to the cross beam.

4. The vehicle body floor assembly for a vehicle according to claim 3, wherein the housing comprises an upper housing and a lower housing, the upper housing and the lower housing jointly define a mounting cavity for mounting the battery module, the upper housing is provided with the vehicle body mounting member, and the upper housing is configured as the vehicle body floor.

5. The vehicle body floor assembly for a vehicle according to claim 3, wherein a connection flange is provided at a circumferential edge of the housing, and the connection flange is connected to the left threshold beam and/or the right threshold beam; and the vehicle body mounting structure further comprises an end beam, the end beam is connected between the left threshold beam and the right threshold beam, and the connection flange is connected to the end beam.

6. The vehicle body floor assembly for a vehicle according to claim 1, wherein the housing is provided with a seat mounting member, and the seat mounting member is used for mounting a seat of the vehicle.

7. The vehicle body floor assembly for a vehicle according to claim 1, wherein the housing is provided with a high-voltage output plug-in and a low-voltage output plug-in, the high-voltage output plug-in is configured to be connected to an output terminal of the battery module, and the low-voltage output plug-in is configured to be communicatively connected to a Battery Management System (BMS) mainboard of the battery pack; and the high-voltage output plug-in and/or the low-voltage output plug-in is provided under a rear seat of the vehicle, and the high-voltage output plug-in and the low-voltage output plug-in are both configured to be connected to an electric appliance component of the vehicle.

8. The vehicle body floor assembly for a vehicle according to claim 1, wherein the battery module is bonded to the housing.

9. The vehicle body floor assembly for a vehicle according to claim 1, wherein the battery pack further comprises a heat exchange structure, the heat exchange structure is provided in the housing and is located on an outer side of the battery module, and the heat exchange structure is used for heat exchange with the battery module.

10. The vehicle body floor assembly for a vehicle according to claim 1, wherein the battery cell comprises a battery cell unit, and the battery module further comprises:

a side frame, wherein the side frame is disposed to surround the battery cell unit;

wherein the avoidance opening is an avoidance groove penetrating the support body.

11. The vehicle body floor assembly for a vehicle according to claim 10, wherein the battery module further comprises a BMS mainboard, and the BMS mainboard is provided on the side frame.

12. The vehicle body floor assembly for a vehicle according to claim 1, wherein the battery cell is a prismatic battery cell, and the battery module further comprises:

a heat exchange structure, wherein the battery cell is sandwiched in the heat exchange structure, and the heat exchange structure is used for heat exchange with the battery cell.

13. The vehicle body floor assembly for a vehicle according to claim 12, wherein the heat exchange structure comprises a plurality of heat exchange plates, the plurality of heat exchange plates are sequentially spaced apart in a length direction of the battery module to form a sandwiching space between every two adjacent heat exchange plates, and the battery cell is sandwiched in the sandwiching space; and each heat exchange plate comprises a first arc-shaped portion and a second arc-shaped portion that are connected to each other, the first arc-shaped portion and the second arc-shaped portion both extend in a length direction of the heat exchange plate, a recessing direction of the first arc-shaped portion and a recessing direction of the second arc-shaped portion are opposite to each other in the length direction of the battery module, and the first arc-shaped portion and the second arc-shaped portion of one heat exchange plate from every two adjacent heat exchange plates are respectively disposed to correspond to the first arc-shaped portion and the second arc-shaped portion of the other heat exchange plate from said two adjacent heat exchange plates.

14. The vehicle body floor assembly for a vehicle according to claim 13, wherein the heat exchange structure further comprises a first side plate and a second side plate, and two ends of each heat exchange plate are respectively connected to and in communication with the first side plate and the second side plate;

the battery module further comprises an end plate, and the end plate is connected to each of two ends of the first side plate and is connected to each of two ends of the second side plate;

and/or the end plate is connected to the cell support structure; and the battery module further comprises a BMS mainboard, and the BMS mainboard is provided on the end plate.

15. The vehicle body floor assembly for a vehicle according to claim 12, wherein the bottom support rib and the support body jointly define a cushioning space, and the cushioning space corresponds to the battery cell in a thickness direction of the support body;

the bottom support rib comprises at least one support rib unit, and each support rib unit together with the support body jointly define one cushioning space;

the bottom support rib comprises a plurality of support rib units, and every two adjacent support rib units are connected to each other;

the avoidance opening is an avoidance hole penetrating the support body, the avoidance hole is provided to correspond to the cushioning space, and an explosion relief valve of the battery cell is disposed to correspond to the avoidance hole;

each support rib unit is provided with a gas discharge notch in communication with the cushioning space; and the cell support structure further comprises a upper support rib, the upper support rib is provided on a surface of the support body close to the battery cell, the upper support rib and the support body jointly define a mounting space for mounting the battery cell, and the upper support rib is configured to be sandwiched between two adjacent battery cells.

16. A vehicle, wherein the vehicle is provided with the vehicle body floor assembly according to claim 1.

* * * * *